US010830592B2

(12) United States Patent
Koshy et al.

(10) Patent No.: US 10,830,592 B2
(45) Date of Patent: Nov. 10, 2020

(54) INDOOR NAVIGATION PATH DETERMINATION SYSTEM

(71) Applicant: Dell Products L.P., Round Rock, TX (US)

(72) Inventors: Kamal Joseph Koshy, Austin, TX (US); Benny J. Bologna, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 15/711,771

(22) Filed: Sep. 21, 2017

(65) Prior Publication Data

US 2019/0086212 A1 Mar. 21, 2019

(51) Int. Cl.
*G01C 21/20* (2006.01)
*H04W 4/02* (2018.01)
*H04W 4/024* (2018.01)
*G01C 21/32* (2006.01)
*H04W 4/33* (2018.01)

(52) U.S. Cl.
CPC ........... *G01C 21/206* (2013.01); *G01C 21/32* (2013.01); *H04W 4/024* (2018.02); *H04W 4/33* (2018.02)

(58) Field of Classification Search
CPC .... G01C 21/206; H04W 4/023; H04W 4/024; H04W 4/04; H04W 4/33
See application file for complete search history.

(56) References Cited

U.S. PATENT DOCUMENTS

| 9,140,555 | B1* | 9/2015 | Andersson | H04W 4/38 |
| 2013/0122935 | A1* | 5/2013 | Das | G01S 5/0252 |
| | | | | 455/456.3 |
| 2014/0187258 | A1* | 7/2014 | Khorashadi | G01C 21/206 |
| | | | | 455/456.1 |
| 2016/0309304 | A1* | 10/2016 | Subramanian | H04W 4/04 |
| 2016/0334218 | A1* | 11/2016 | Heshmati | G01B 21/00 |
| 2016/0345129 | A1* | 11/2016 | Lee | H04W 4/023 |
| 2017/0074965 | A1* | 3/2017 | Lee | G01S 5/0252 |
| 2017/0171718 | A1* | 6/2017 | Jeong | H04W 4/80 |
| 2017/0245116 | A1* | 8/2017 | Chu | H04W 4/043 |
| 2017/0269189 | A1* | 9/2017 | Swindell | G01S 1/024 |
| 2018/0245927 | A1* | 8/2018 | Frish | G01C 21/165 |

* cited by examiner

*Primary Examiner* — Anshul Sood
(74) *Attorney, Agent, or Firm* — Haynes and Boone, LLP

(57) ABSTRACT

A navigation path determination system includes wireless access point devices positioned around an indoor space. While located at different indoor space locations around the indoor space, user devices transmit wireless communications with the wireless access point devices, identify wireless access point device/user device relative positioning information in respective wireless communications with each of the wireless access point devices, and transmit the relative positioning information to a navigation system. The navigation system uses the relative positioning information to determine a respective user path through the indoor space by each user device, and stores the respective user paths in a navigation path database for later use in determining a navigation path through the indoor space. The relative positioning information for each indoor space location may be unique combination of sets of wireless access point device identifiers and time-of-flight information for wireless communication transmitted by corresponding wireless access point devices.

20 Claims, 16 Drawing Sheets

INDOOR NAVIGATION PATH DETERMINATION SYSTEM

BACKGROUND

The present disclosure relates generally to information handling systems, and more particularly to determining indoor navigation paths using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes used to provide for indoor navigation. Conventionally, such information handling systems requires user location sensors distributed throughout a building, along with mapping information that precisely maps the unobstructed and obstructed areas within the indoor space of the building, while also detailing accurate locations of the user location sensors within that indoor space. In order to provide for indoor navigation, the user location sensors in the building operate to detect user devices (e.g., mobile phones) carried by users, and the indoor navigation system then uses the locations of the user location detailed in the mapping information to determine a current user device location of any detected user device within the indoor space. If a user of one of those user devices then identifies a destination location, the indoor navigation system may utilize the mapping information that precisely maps the unobstructed and obstructed areas within the indoor space to determine a navigation path through the indoor space that avoids obstructions while ending up at the destination location. However, the mapping information utilized by such conventional indoor navigation systems requires significant effort to produce, and is often not detailed enough to provide accurate and obstruction-free indoor navigation. Furthermore, such mapping information is static, and indoor spaces like those in the building described above may include dynamic or semi-static features (e.g., "work cubes", partitions, furniture, etc.) that can move and/or otherwise change their locations or orientations within the indoor space, while features may also be added to or removed from the indoor space over time, requiring the mapping information to be periodically updated to account for such changes in the indoor space. As such, providing for indoor navigation is time intensive and expensive, which prevents indoor navigation from being implemented in many situations where it would be useful.

Accordingly, it would be desirable to provide an improved indoor navigation path determination system.

SUMMARY

According to one embodiment, an Information Handling System (IHS) includes a processing system; and a memory system that is coupled to the processing system and that includes instructions that, when executed by the processing system, cause the processing system to provide a navigation path engine that is configured to: receive, through a network from each of a plurality of user devices, wireless access point device/user relative positioning information received by that user device via respective wireless communications with each of a plurality of wireless access point devices positioned around an indoor space, and identified by that user device while located at each of a plurality of different indoor space locations around the indoor space; determine, using the wireless access point device/user device relative positioning information received from each of the plurality of user devices, a respective user path through the indoor space by that user device; store each of the plurality of respective user paths in a navigation path database; and determine, using the plurality of respective user paths stored in the navigation path database, a navigation path through the indoor space.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
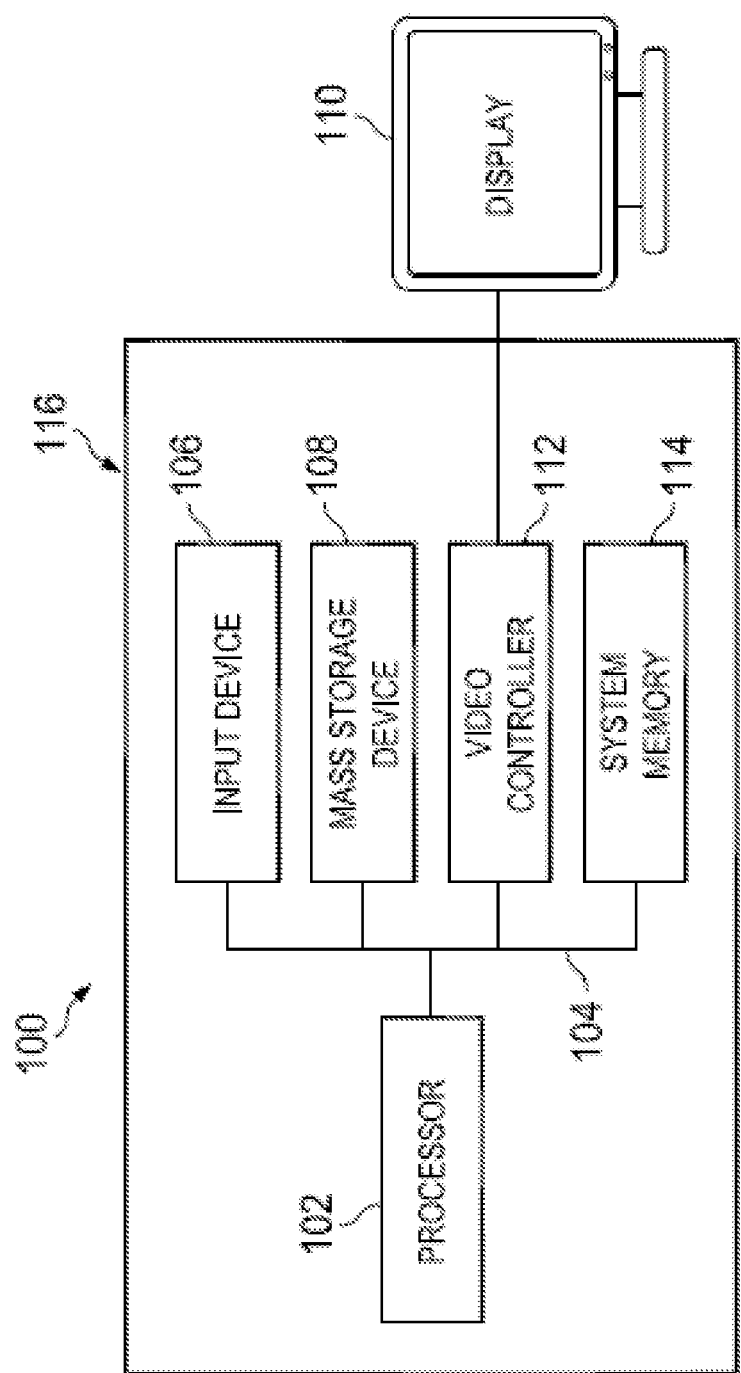
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
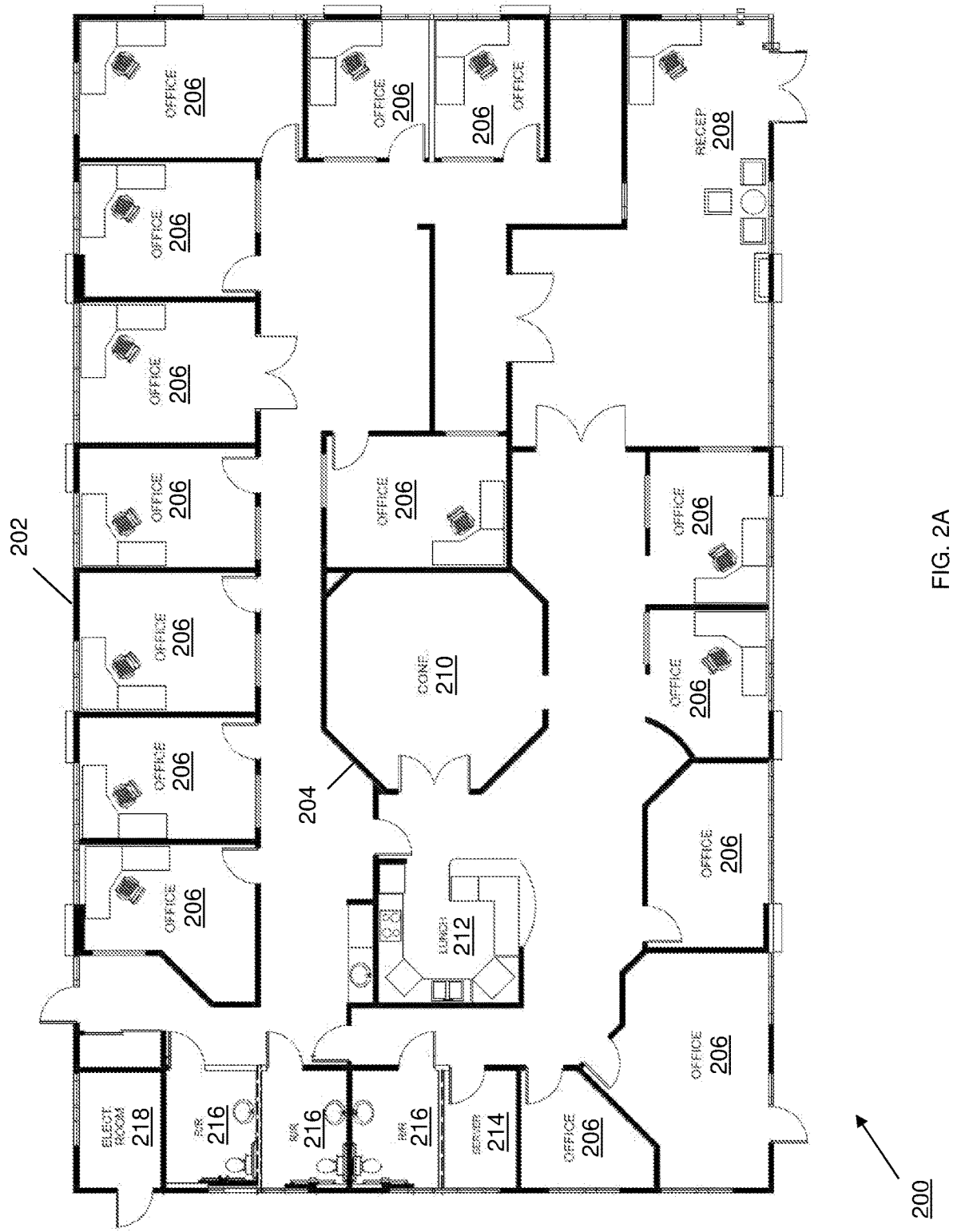
FIG. 2A is a layout view illustrating an embodiment of an indoor space provided in a building.
Figure 2B:
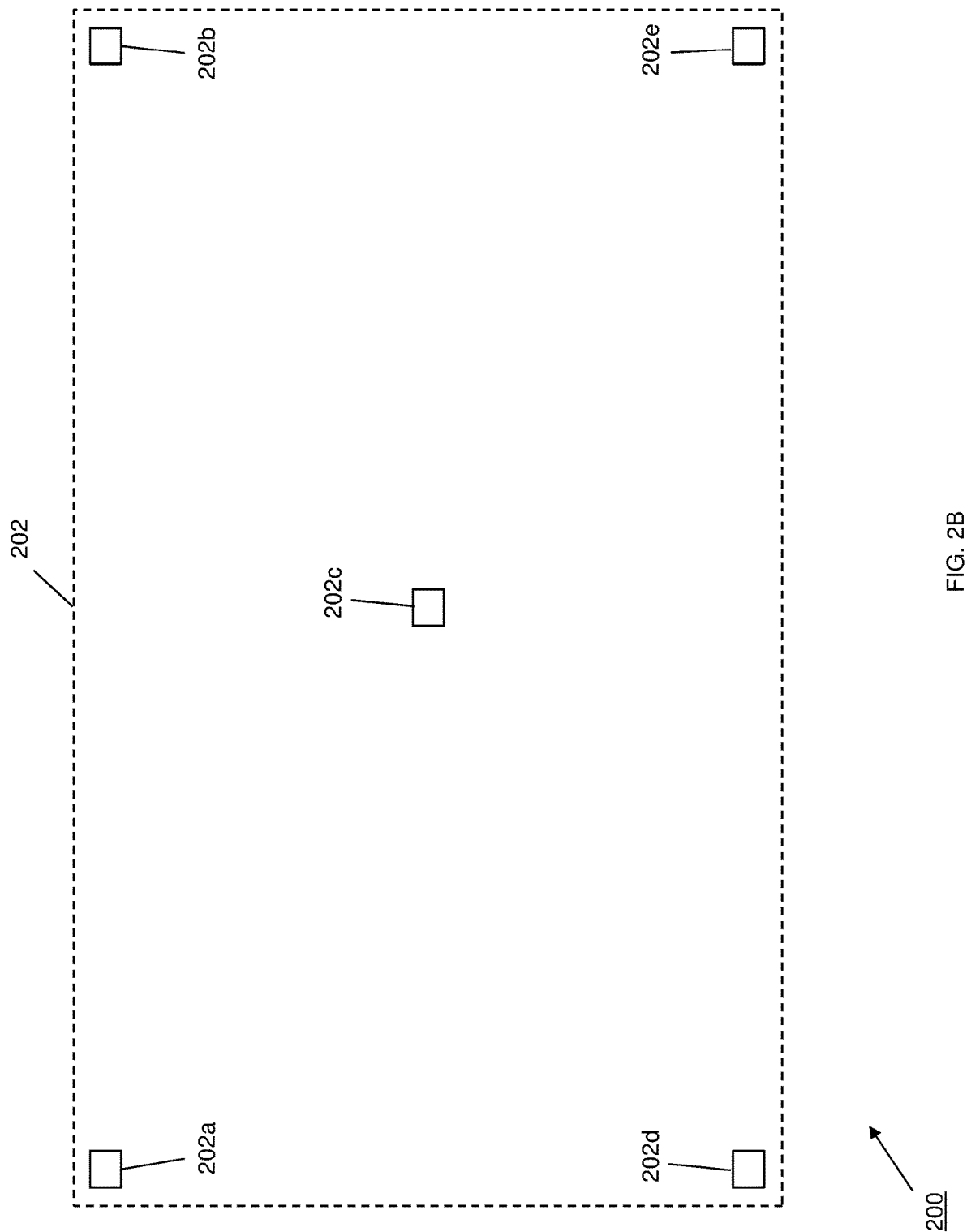
FIG. 2B is a schematic view illustrating an embodiment of wireless access point devices located in the indoor space of FIG. 2A.

Referring now to FIGS. 2A and 2B, an embodiment of an indoor space 200 is illustrated. In an embodiment, the indoor space 200 may be defined by a building having an outer wall 202 that defines the indoor space 200, and a plurality of inner walls 204 that define areas included in the indoor space 200. In the illustrated embodiment, the indoor space 200 includes office rooms 206, a reception room 208, a conference room 210, a kitchen room 212, a server room 214, restrooms 216, and an electrical room 218. While one of skill in the art in possession of the present disclosure will recognize that the specific indoor space 200 is provided on a single floor of a building, multiple floor indoor spaces with a variety of configurations will fall within the scope of the present disclosure as well. Furthermore, while the discussions of the navigation through the indoor space 200 are focused on navigation within the indoor space 200 (i.e., primarily bounded by the outer wall 202), navigation outside of the indoor space 200 (e.g., through a parking lot or garage, on a roof, and/or through other areas) will fall within the scope of the present disclosure as well.

In the illustrated embodiment, each of the areas included in the indoor space 200 may include area elements such as, for example, the desks and chairs located in the office rooms 206; the desk, chair, and sitting area located in the reception room 208; a table and chairs (not illustrated) located in the conference room 210; counters, chairs, and kitchen appliances located in the kitchen room 212; server racks and servers (not illustrated) located in the server room 214; sinks, toilets, urinals, and stalls located in the restrooms 216; and electrical equipment located in the electrical room 218. However, while specific examples of area elements are illustrated and described, one of skill in the art in possession of the present disclosure will appreciate that any of a variety of areas and area elements may be provided in an indoor space while remaining within the scope of the present disclosure.

FIG. 2B illustrates how a plurality of wireless access point devices 202a, 202b, 202c, 202d, and 202e may be positioned around the indoor space 200. In several of the embodiments discussed below, the wireless access point devices 202a-e are configured to operate according to the Institute of Electrical and Electronics Engineers (IEEE) 802.11mc standard by, at least in part, providing time-of-flight information in wireless communications with another device. For example, the wireless access point devices may be provided by Wireless Local Area Network (WLAN) or Wireless Personal Area Network (WPAN) devices. However, one of skill in the art in possession of the present disclosure will recognize that other types of wireless networking devices, wireless beacon devices, and/or other wireless communication devices may utilize features and/or generate information (e.g., other than the time-of-flight information discussed below) that allow for the functionality provided using the time-in-flight information as described herein, and thus those other wireless communications devices may replace the wireless access point devices while falling within the scope of the present disclosure as well. As would be understood by one of skill in the art in possession of the present disclosure, the wireless access point devices may be positioned anywhere around the indoor space 200, including on the inner walls 204, on area elements (e.g., the tables) provided in the area included in the indoor space, on or in the floors provided in the indoor space 200, on or in the ceilings provided in the indoor space 200, outside of the indoor space (e.g., on the other side of the outer walls 202 from the indoor space 200 such as in a parking lot or garage, on a rooftop, etc.), and/or in any other location that provides for the functionality discussed below. While five wireless access point devices are illustrated, one of skill in the art in possession of the present disclosure will recognize that fewer wireless access devices (e.g., three wireless access point devices if elevation information is not to be used by the navigation path system discussed below, and four wireless access point devices if elevation information is to be used by the navigation system discussed below), or more wireless access point devices, may be provided around the indoor space 200 while remaining within the scope of the present disclosure.

Figure 3:
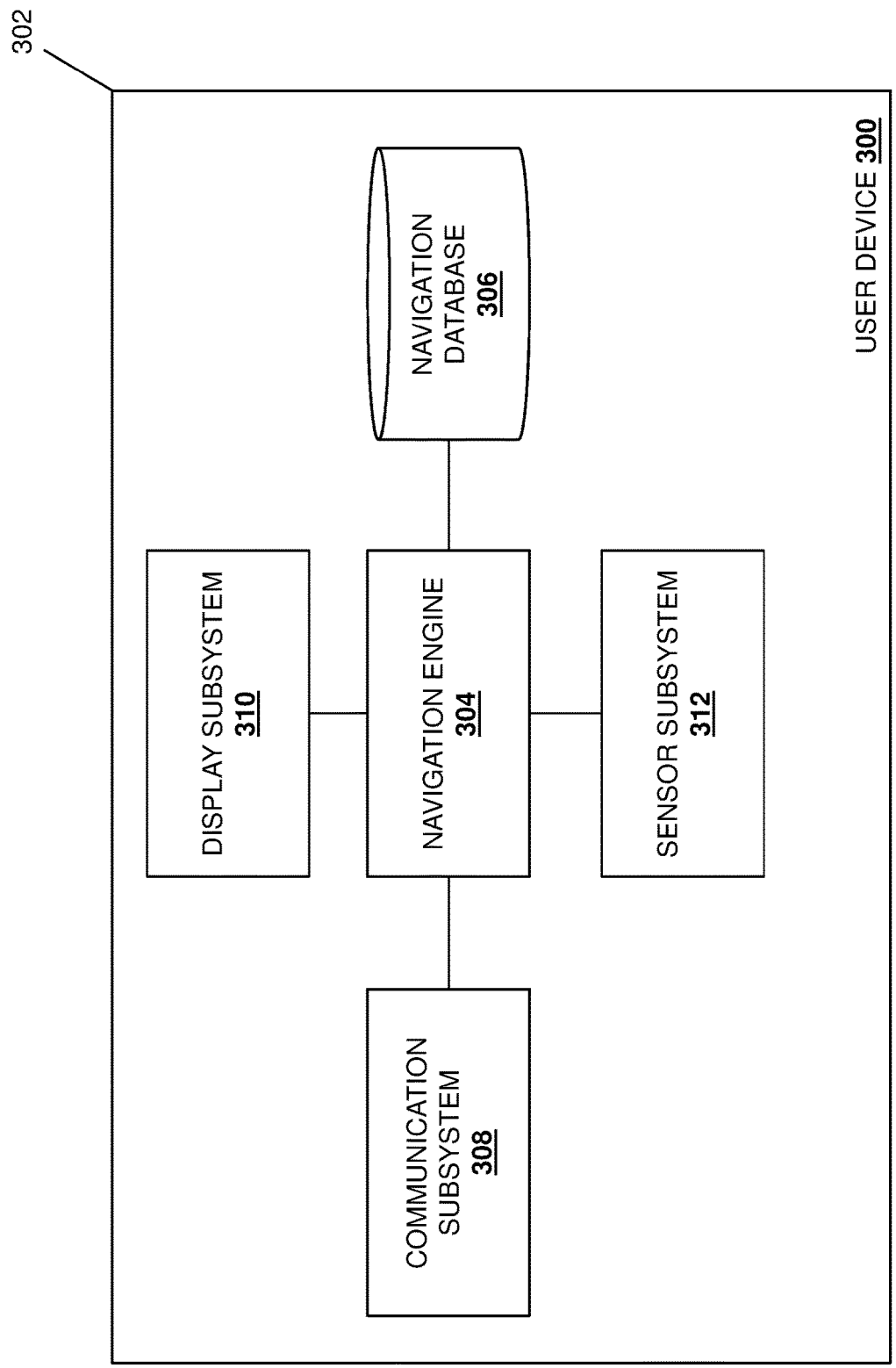
FIG. 3 is a schematic view illustrating an embodiment of a user device.

Referring now to FIG. 3, an embodiment of a user device 300 is illustrated. In an embodiment, the user device 300 may be the IHS 100 discussed above with reference to FIG. 1, and/or may include some or all of the components of the IHS 100. In several of the examples discussed below, the user device 300 is described as a mobile phone, but one of skill in the art in possession of the present disclosure will recognize that other types of mobile computing devices such as laptop/notebook computers, tablet computers, wearable computers (e.g., smart watches), and/or other mobile devices will fall within the scope of the present disclosure as well. In the illustrated embodiment, the user device 300 includes a chassis 302 that houses the components of the user device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a navigation engine 304 that is configured to perform the functions of the navigation engines and user devices discussed below.

The chassis 302 may also house a storage system (not illustrated, but which may include the storage device 108 discussed above with reference to FIG. 1) that is coupled to the navigation engine 304 (e.g., via a coupling between the storage system and the processing system) and that stores a navigation database 306 that may include the information used to provide the functionality discussed below. The chassis 302 may also house a communication subsystem 308 that is coupled to the navigation engine 304 (e.g., via a coupling between the communication subsystem 308 and the processing system) and that may include a wireless communication device such as a WiFi communication device, a Near Field Communication (NFC) device, a Bluetooth® wireless communication device, and/or other wireless communications devices that would be apparent to one of skill in the art in possession of the present disclosure.

The chassis 302 may also house a display subsystem 310 that is coupled to the navigation engine 304 (e.g., via a coupling between the display subsystem 310 and the processing system) and that is illustrated and described below as a touch input display system, although other types of display systems are envisioned as falling within the scope of the present disclosure as well. The chassis 302 may also house a sensor subsystem 312 that is coupled to the navigation engine 304 (e.g., via a coupling between the sensor subsystem 312 and the processing system) and that may include accelerometer devices, gyroscope devices, pedometer devices, and/or any of a variety of other sensor devices that would be apparent to one of skill in the art in possession of the present disclosure. While a specific user device has been described, one of skill in the art in possession of the present disclosure will recognize that user devices may include a variety of different components and/or component configurations for providing conventional user device functionality, as well as the functionality discussed below, while remaining within the scope of the present disclosure.

Figure 4:
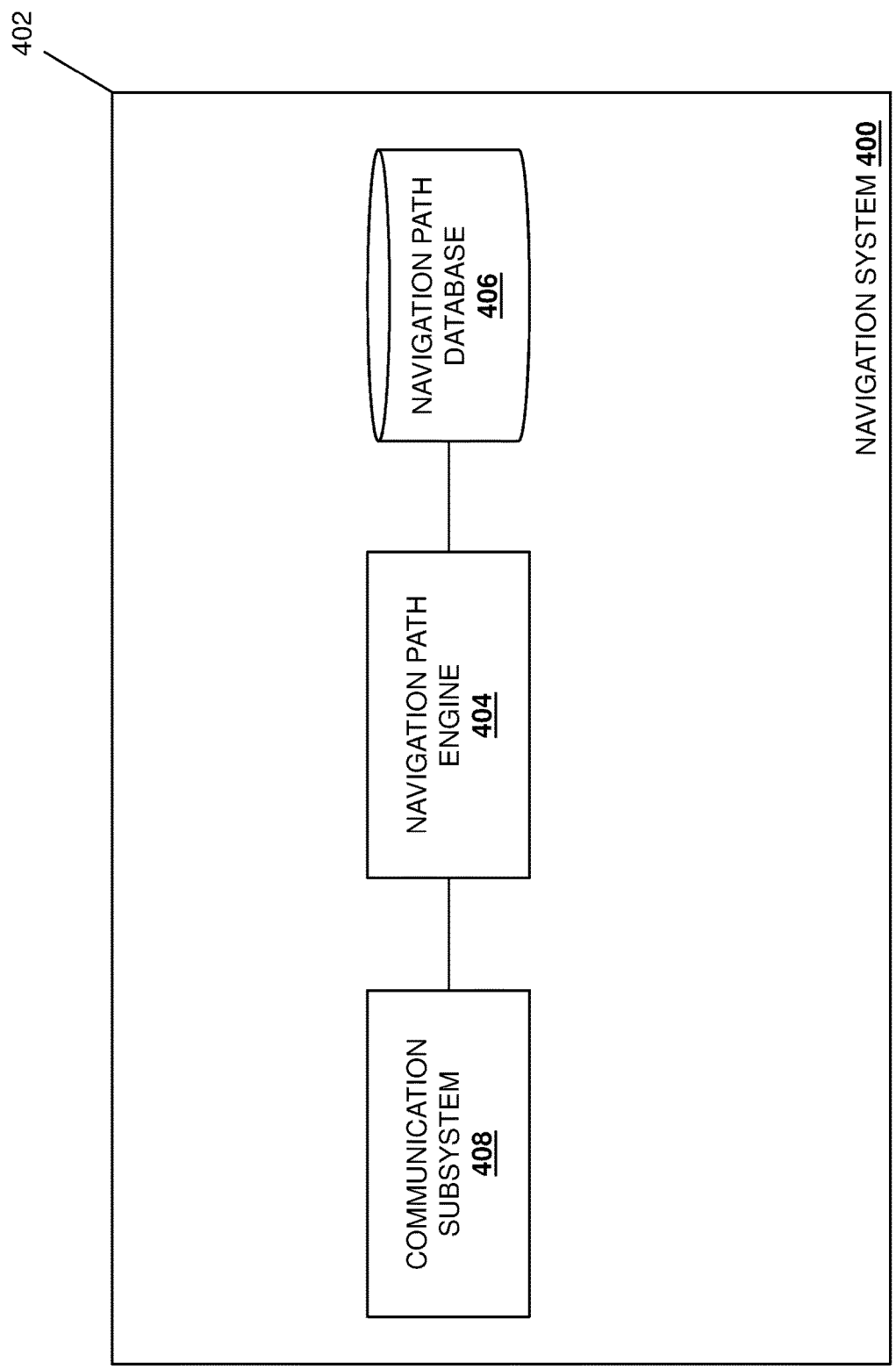
FIG. 4 is a schematic view illustrating an embodiment of a navigation system.

Referring now to FIG. 4, an embodiment of a navigation system 400 is illustrated. In an embodiment, the navigation system 400 may be the IHS 100 discussed above with reference to FIG. 1, and/or may include some or all of the components of the IHS 100. In several of the examples discussed below, the navigation system 400 is described as a network connected server device, but one of skill in the art in possession of the present disclosure will recognize that multiple server devices may operate to provide the functionality discussed below while falling within the scope of the present disclosure as well. In the illustrated embodiment, the navigation system 400 includes a chassis 402 that houses the components of the navigation system 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a navigation path engine 404 that is configured to perform the functions of the navigation path engines and navigation systems discussed below.

The chassis 402 may also house a storage system (not illustrated, but which may include the storage device 108 discussed above with reference to FIG. 1) that is coupled to the navigation path engine 404 (e.g., via a coupling between the storage system and the processing system) and that stores a navigation path database 406 that may include the information used to provide the functionality discussed below. While illustrated as located in the chassis 402, the storage system storing the navigation path database 406 may be a cloud storage system that is connected to the navigation system 400 and accessible through a network while remaining within the scope of the present disclosure as well. The chassis 402 may also house a communication subsystem 408 that is coupled to the navigation path engine 404 (e.g., via a coupling between the communication subsystem 408 and the processing system) and that may include a Network Interface Controller (NIC), wireless communication devices such as a WiFi communication device, a Near Field Communication (NFC) device, a Bluetooth® wireless communication device, and/or other wireless communications devices, and/or a variety of other communication components that would be apparent to one of skill in the art in possession of the present disclosure. While a specific navigation system has been described, one of skill in the art in possession of the present disclosure will recognize that navigation systems may include a variety of different components and/or component configurations for providing conventional server device functionality, as well as the functionality discussed below, while remaining within the scope of the present disclosure.

Figure 5:
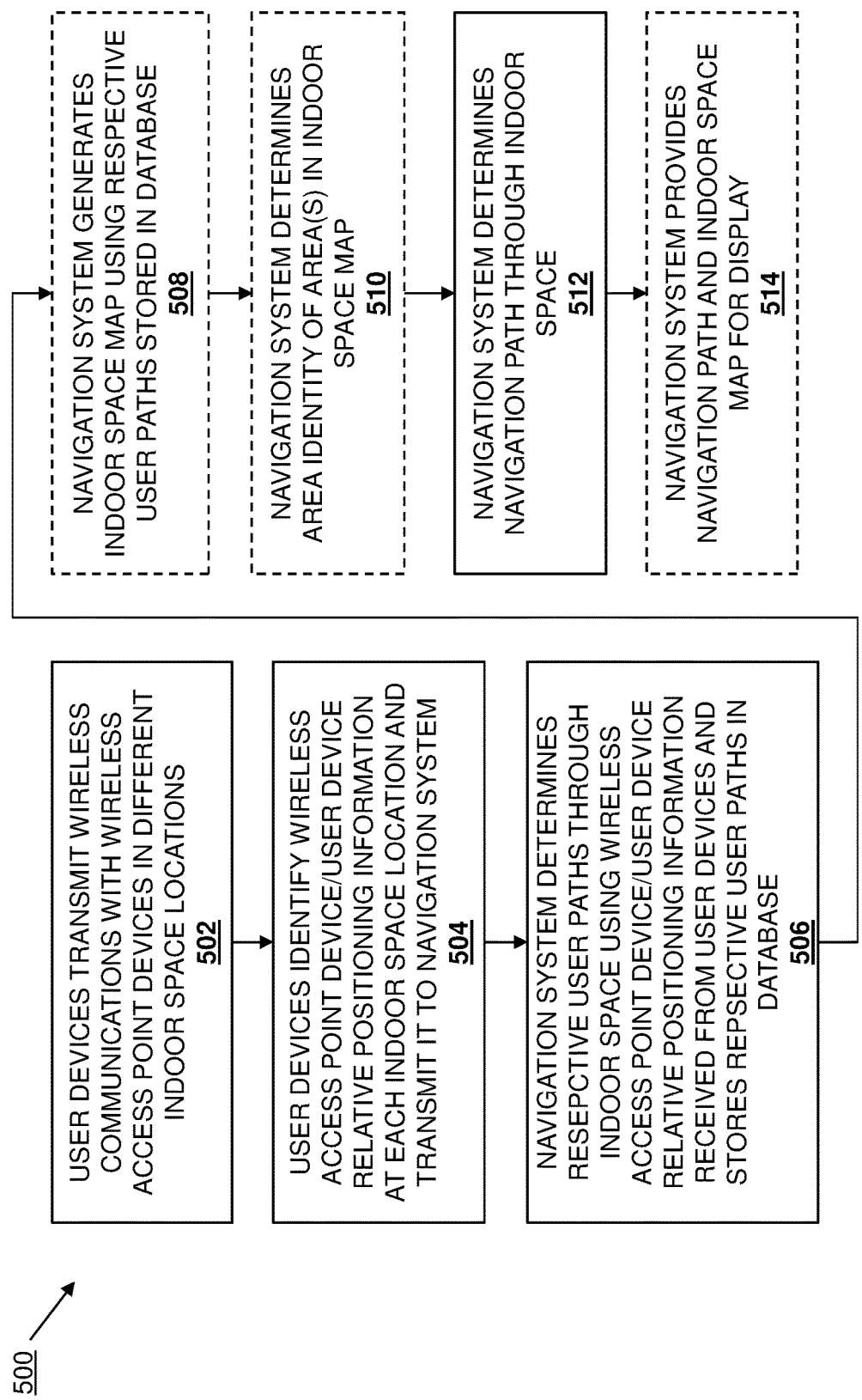
FIG. 5 is a flow chart illustrating an embodiment of a method for determining indoor navigation paths.

Referring now to FIG. 5, an embodiment of a method 500 for determining indoor navigation paths is illustrated. As discussed below, the systems and methods of the present disclosure provide for the determination of navigation paths through an indoor space without requiring the pre-provisioning of conventional mapping information that precisely maps the unobstructed and obstructed areas in the indoor space of the building and that details the locations of each of the user location sensors in that indoor space. Rather, the systems and methods of the present disclosure may collect unique combinations of relative positioning information communicated by a plurality of wireless communication devices to user devices located at any of a plurality of indoor space locations around the indoor space. The unique combinations of the relative positioning information may then be used to define each indoor space location around the indoor space, and allow for the determination and storage of the user path of any particular user device through the indoor space. Once a plurality of user paths around the indoor space have been determined and stored, those user paths may be analyzed to determine available navigation paths through the indoor space, while also indicating obstructions in the indoor space (e.g., portions of the indoor space that the stored user paths (or recently stored user paths) do not cross.) As such, a subsequent navigation path for a user through the indoor space may be generated based on the available navigation path determinations as discussed above.

Furthermore, in some embodiments, graphical indoor space maps may be generated with increasing accuracy as more and more user paths are provided to the system by user devices, and the systems and methods may utilize a variety of information sources and/or analytical techniques to identify areas around the graphical indoor space maps. For example, the use of access point devices that are correlated with building maps (e.g., enabling the determination of the relative location of those access points within a relatively undetailed building map) may enable the generation of more detailed graphical indoor space maps. However, even without such graphical indoor space maps, relative navigation directions (e.g., "turn right", "turn left", etc.) may be displayed. As such, indoor space navigation is enabled using relative positioning information that may be communicated by wireless communication devices located around the indoor space, and without the need to generate and periodically update the time intensive and expensive conventional mapping information that is required by conventional indoor space navigation systems, thus providing for increased adoption of indoor space navigation systems.

Figure 6A:
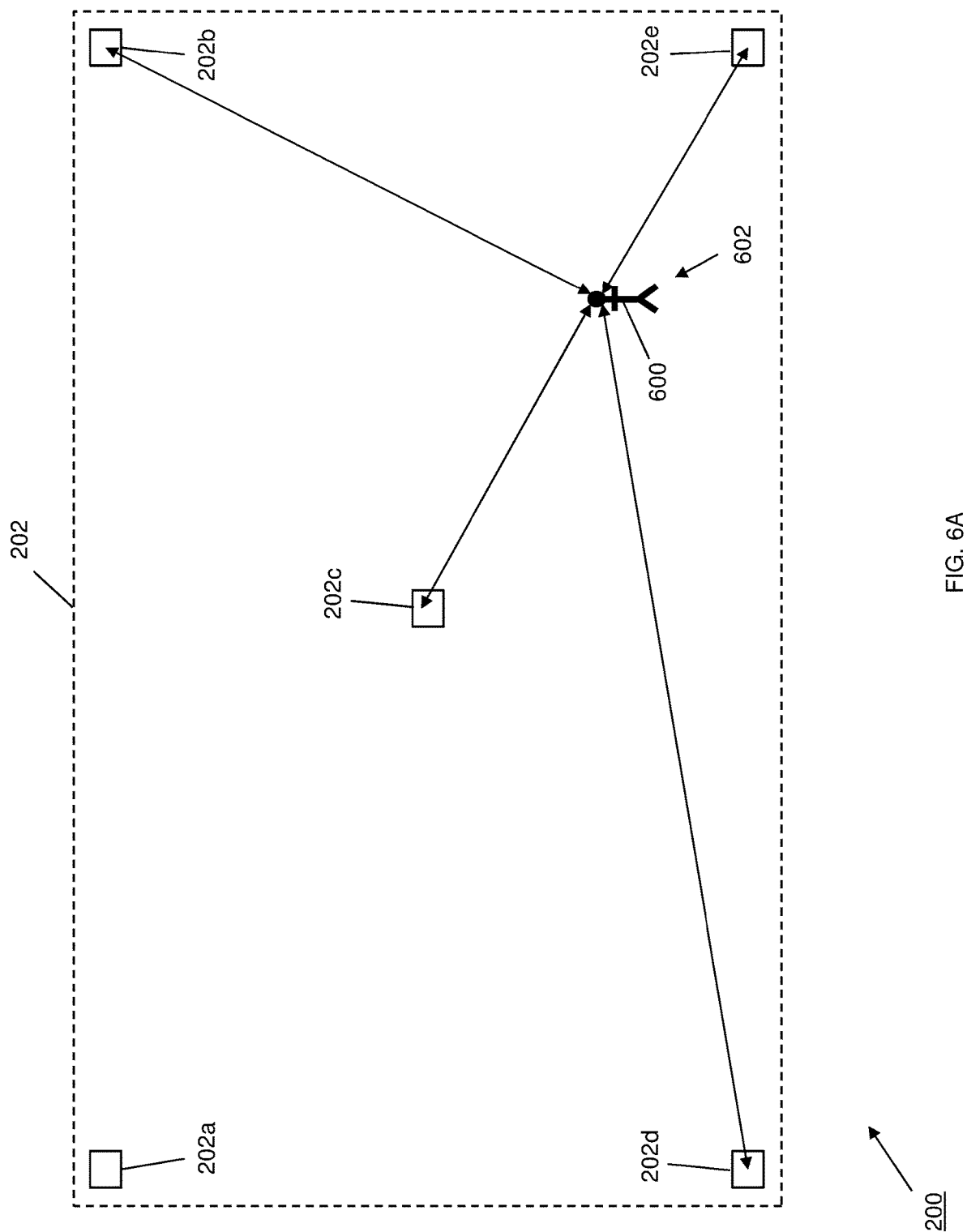
FIG. 6A is a schematic view illustrating an embodiment of a wireless location signature being determined for a first indoor space location in the indoor space of FIG. 2A by at least some of the wireless access point devices of FIG. 2B.
Figure 6B:
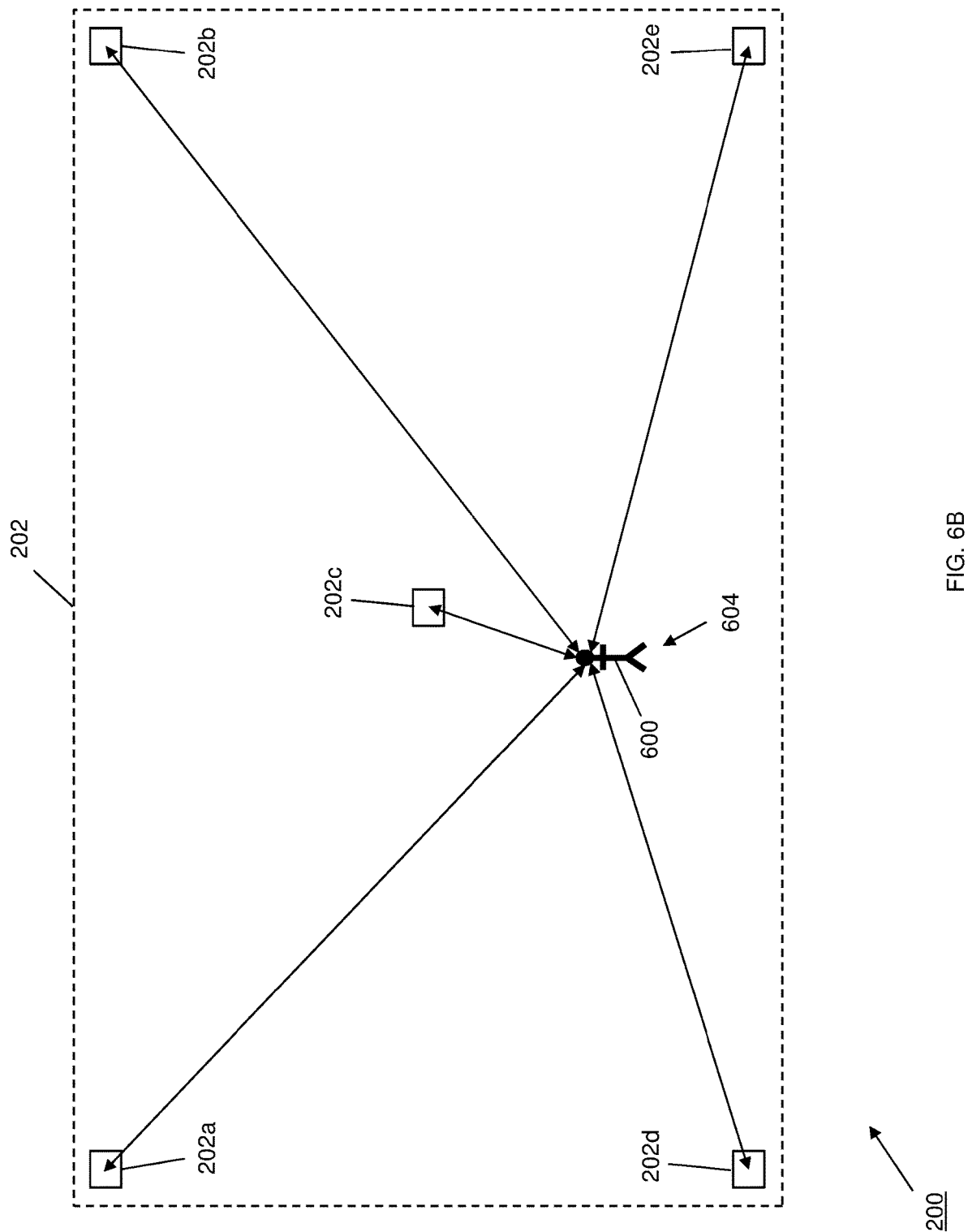
FIG. 6B is a schematic view illustrating an embodiment of a wireless location signature being determined for a second indoor space location in the indoor space of FIG. 2A by at least some of the wireless access point devices of FIG. 2B.

The method 500 begins at block 502 where user devices transmit wireless communications with wireless access point devices in different indoor space locations. Referring first to FIGS. 6A and 6B, an embodiment of a user 600 moving between two indoor space locations 602 and 604 in the indoor space 200 is illustrated. The embodiment of FIGS. 6A and 6B (as well as in FIGS. 7A, 7B, and 7C) illustrates the indoor space 200 only including an indicator of the outer wall 202 (illustrated with a dashed line) and the wireless access point devices 202a-e in an effort to illustrate how the system "learns" the layout of the indoor space 200. As such, one of skill in the art in possession of the present disclosure will recognize that the indoor space 200 illustrated in FIGS. 6A, 6B, and 7A-C includes all the features (rooms, inner walls 204, area elements, obstructions, etc.) illustrated in FIG. 2A, and that the user 600 movement through the indoor space 200 (e.g., from the indoor space location 602 to the indoor space location 604) is performed in consideration of those features. As such, one of skill in the art in possession of the present disclosure will recognize that the discussion of the movement of the user 600 through the indoor space 200 may be applied to any indoor space while remaining within the scope of the present disclosure.

In FIGS. 6A and 6B, the user 600 carries the user device 300 that is configured to transmit wireless communications with any of the wireless access point devices 202a-e (e.g., via the navigation engine 304 using the communication subsystem 308) as the user 600 moves through the indoor space 200, and one of skill in the art in possession of the present disclosure will appreciate that any number of users may include similar user devices that operate in substantially the same manner as discussed below as those users move through the indoor space 200. In a specific example, at block 502, the navigation engine 304 and/or the communication subsystem 308 in the user device 300 may operate to establish, or attempt to establish, a wireless communication session with one or more of the wireless access point devices 202a-e. As such, at block 502, the wireless access point devices 202a-e may be transmitting a wireless communication that is detected by the user device 300, and the user device 300 may operate to utilize that wireless communication as discussed below, or may operate to establish a wireless communication session (e.g., by providing credentials such as a username and password or otherwise authenticating to a wireless network provided by the wireless access point devices 202a-e) so that subsequent wireless communications that are part of that wireless communication session may be utilized as discussed below. One of skill in the art in possession of the present disclosure will recognize that user devices need not be logged into a wireless network provided by the wireless access point devices 202a-e in order to perform the wireless communications discussed below (e.g., receive the time of flight information as discussed below.) Furthermore, the location tracking of user devices described below may also be performed by the wireless access point devices 202a-e, or a device viewing wireless communications as a third party (e.g., a device intercepting the wireless communications between user devices and the wireless access point devices 202a-e.)

As such, as the user 600 moves through the indoor space 200 (e.g., to the indoor space location 602, from the indoor space location 602 to the indoor space location 604, and from the indoor space location 604), the user device 300 may continuously wirelessly communicate with any or all the wireless access point devices 202a-e. While the wireless access point devices 202a-e are described below as providing a common wireless network, wireless access point devices providing different wireless networks will fall within the scope of the present disclosure as well. Furthermore, as discussed above, the wireless access point devices 202a-e may be replaced by any wireless communication devices (e.g., wireless beacon devices, etc.) that are configured to perform the wireless communications discussed below while remaining within the scope of the present disclosure. For example, any stationary device capable or wireless communications may perform the functions of the wireless access point devices 202a-e.

The method 500 then proceeds to block 504 where the user devices identify wireless access point device/user device relative positioning information at each indoor space location, and transmit the wireless access point device/user device relative positioning information to a navigation system. As discussed above, the indoor navigation path determination system of the present disclosure may operate via a network connected server system (e.g., that includes the navigation system 400 discussed above) that collects the wireless access point device/user device relative positioning information identified by user devices and, in some embodiments, stores that wireless access point device/user device relative positioning information in the cloud. For example, the indoor navigation path determination system may be provided as part of a web-accessible mapping system (e.g., GOOGLE® maps, YAHOO® maps, MAPQUEST®, etc.) that provides a variety of navigation functionality for users, and the users of the user devices 300 discussed below may provide the wireless access point device/user device relative positioning information discussed below as part of their participation in those web-based mapping systems. In another example, the indoor navigation path determination system may be provided as part of an application-accessible mapping system (e.g., GOOGLE® maps, iOS® maps, etc.) that provides a variety of navigation functionality for users, and the users of the user devices 300 discussed below may provide the wireless access point device/user device relative positioning information discussed below as part of their participation in those application-based mapping systems. However, while a few examples of mapping services have been described, one of skill in the art in possession of the present disclosure will recognize that the indoor navigation path determination system may be provided as part of a variety of navigation services (e.g., automobile navigation, employee/employer applications, etc.) while remaining within the scope of the present disclosure as well.

In an embodiment, at block 504, the user device 300 operates to identify wireless access point/user device relative positioning information at each indoor space location in the indoor space 200. For example, as illustrated in FIG. 6A, at the indoor space location 602 the navigation engine 304 in the user device 300 receives wireless communications (indicated by the arrows in FIG. 6A) from the wireless access point devices 202b, 202c, 202d, and 202e (e.g., the user 600 and user device 300 are not within range of the wireless communications provided by the wireless access point device 202a in this embodiment.) In response, the navigation engine 304 in the user device 300 may operate to identify respective wireless access point/user device relative positioning information in the wireless communications received from each of the wireless access point devices 202b, 202c, 202d, and 202e.

In a specific example, at block 504 and in the embodiment illustrated in FIG. 6A, each of the wireless access point devices 202b, 202c, 202d, and 202e may transmit (as part of the wireless communications with the user device 300 discussed above) wireless access point/user device relative positioning information that includes a wireless access point device identifier that is associated with that wireless access point device, and time-of-flight information for the wireless communication provided by that wireless access point device. In an embodiment, the time-of-flight information included in the wireless communications provided by the wireless access point devices may include a send timestamp that is provided in that wireless communication by that wireless access point device, and that is indicative of a time the wireless communication was sent by that wireless access point device. As would be understood by one of skill in the art in possession of the present disclosure, the user device 300 (e.g., the navigation engine 304) or the navigation system 400 (e.g., the navigation path engine 404) may utilize the send timestamp provided in a wireless communication (along with a receive timestamp determined and/or provide by the user device receiving that wireless communication) to calculate the time period that was required to transmit that wireless communications from the wireless access point device to the user device 300, and that time period is associated with a distance and/or relative position of the user device 300 with respect to that wireless access point device. Furthermore, the granularity of such time-of-flight information is currently on the order of nanoseconds, and one of skill in the art in possession of the present disclosure will appreciate that its accuracy may increase in the future.

As such, at block 504 and while in the indoor space location 602 in the indoor space 200, the navigation engine 304 in the user device 300 may identify time-of-flight information and a wireless access point device identifier (e.g., a Media Access Control (MAC) address) for the wireless access point device 202b in the wireless communications received from the wireless access point device 202b, time-of-flight information and a wireless access point device identifier (e.g., a MAC address) for the wireless access point device 202c in the wireless communications received from the wireless access point device 202c, time-of-flight information and a wireless access point device identifier (e.g., a MAC address) for the wireless access point device 202d in the wireless communications received from the wireless access point device 202d, and time-of-flight information and a wireless access point device identifier (e.g., a MAC address) for the wireless access point device 202e in the wireless communications received from the wireless access point device 202e. However, while the utilization of MAC addresses as the wireless access point device identifiers has been described, other identifiers may be utilized to identify a distinct source of particular time-of-flight information while remaining within the scope of the present disclosure.

As discussed in further detail below, the wireless access point/user device relative positioning information collected from each the wireless access point devices at the indoor space location 602 in the indoor space 200 (as well as at any other indoor space location in the indoor space 200) provides a unique combination of information that may be utilized to define the indoor space location 602. The table below illustrates a specific example of sets of the wireless access point device identifiers and time-of-flight information (e.g., a "MAC ADDRESS 202b" identifying the wireless access point device 202b along with time-of-flight information that was identified in the wireless communications received from the wireless access point device 202b at the indoor space location 602, a "MAC ADDRESS 202c" identifying the wireless access point device 202c along with time-of-flight information that was identified in the wireless communications received from the wireless access point device 202c at the indoor space location 602, etc.) that may be used to define an indoor space location 602 by associating a "wireless location signature" with that indoor space location 602:

| WIRELESS ACCESS POINT DEVICE IDENTIFIER | TIME-OF-FLIGHT INFORMATION |
| --- | --- |
| MAC ADDRESS 202b | 110 nS |
| MAC ADDRESS 202c | 55 nS |
| MAC ADDRESS 202d | 200 nS |
| MAC ADDRESS 202e | 40 nS |

In the example provided in the table above, the time-of-flight information includes a calculated time-of-flight (in nanosecond (nS)) that, as discussed above, may be determined by the navigation engine 304 in the user device 300 using the send timestamps provided in the wireless communications provided by the wireless access point devices (along with receive timestamps determined by the navigation engine 304.) However, in other embodiments, different time-of-flight information may be utilized while remaining within the scope of the present disclosure. For example, the wireless access point device identifier for a wireless access point device may be associated with the send time stamp provided by that wireless access point device and the receive time stamp provided by the user device (i.e., so that the navigation system may determine the calculated time-of-flight information in the table above.) In another example, the wireless access point device identifier for a wireless access point device may be associated with a calculated distance and/or relative position between that wireless access point device and the user device 300. As such, a variety of time-of-flight information may be utilized to define the indoor space location 602 by associating a wireless location signature with that indoor space location 602 while remaining within the scope of the present disclosure. Furthermore, while specific wireless access point/user device relative positioning information that utilizes time-of-flight information has been described, one of skill in the art in possession of the present disclosure will recognize that other types of information (e.g., other parameters that are known to change at a predictable rate in wireless communications between two devices) may provide similar functionality as described below, and thus that information will fall within the scope of the present disclosure as well.

One of skill in the art in possession of the present disclosure will appreciate how the table above illustrates a unique wireless location signature for the indoor space location 602 that includes a unique combination of time-of-flight information corresponding to particular wireless access point devices, and how any other indoor space location may result in a corresponding unique wireless location signature, as the time-of-flight information identified in the wireless communications received from at least one of the wireless access point devices will change in response to movement of the user device 300 from the indoor space location 602 (e.g., as illustrated and described with reference to FIG. 6B below.) For example, the wireless access point identifier/time-of-flight information included in a wireless location signature may be utilized to determine distances from the wireless access point devices, and to perform triangulation techniques that define a relative location in the indoor space 200. However, it will also be appreciated that similar information may be determined from other types of wireless access point/user device relative positioning information while remaining within the scope of the present disclosure.

In some embodiments, at block 504 the navigation engine 304 in the user device may operate to store the wireless access point/user device relative positioning information collected from each the wireless access point devices at the indoor space location 602 in the navigation database 306. Furthermore, at block 504, the navigation engine 304 in the user device 300 operates to transmit the wireless access point/user device relative positioning information collected from each the wireless access point devices at the indoor space location 602 through the communication subsystem 308 to the navigation system 400 (e.g., via a network provided by the wireless access point devices 202*a-e*, via a different network (e.g., a cellular network accessible via the communication subsystem 308), etc.) Further still, in addition to the wireless access point/user device relative positioning information, user devices 300 may transmit any sensor information collected via their sensor subsystems 312 at any indoor space location as those user devices 300 move through the indoor space 200. For example, accelerometer data from accelerometer devices in the user device 300, directionality data from gyroscope devices in the user device 300, pedometer data from pedometer devices, and/or any of a variety of other sensor data from sensor devices in the user device 300, may be transmitted to the navigation system 400 at block 504. As such, in addition to relative positioning information, acceleration information, directionality information, step information, and/or other sensor information may be provided to the navigation system 400 at block 504.

In another specific example, at block 504 and as illustrated in FIG. 6B, at the indoor space location 604 the navigation engine 304 in the user device 300 receives wireless communications from the wireless access point devices 202*a*, 202*b*, 202*c*, 202*d*, and 202*e* (e.g., the user 600 and user device 300 have moved within range of the wireless communications provided by the wireless access point device 202*a* in this embodiment.) In response, the navigation engine 304 in the user device 300 may operate to identify respective wireless access point/user device relative positioning information in the wireless communications received from each of the wireless access point devices 202*a*, 202*b*, 202*c*, 202*d*, and 202*e*. Similarly as discussed above, in a specific embodiment each of the wireless access point devices 202*a*, 202*b*, 202*c*, 202*d*, and 202*e* may transmit (as part of the wireless communications with the user device 300 discussed above) wireless access point/user device relative positioning information that includes a wireless access point device identifier that is associated with that wireless access point device, and time-of-flight information for the wireless communication provided by that wireless access point device.

As such, at block 502 and while in the indoor space location 604 in the indoor space 200, the navigation engine 304 in the user device 300 may identify time-of-flight information and a wireless access point device identifier (e.g., a MAC address) for the wireless access point device 202*a* in the wireless communications received from the wireless access point device 202*a*, time-of-flight information and a wireless access point device identifier (e.g., a MAC address) for the wireless access point device 202*b* in the wireless communications received from the wireless access point device 202*b*, time-of-flight information and a wireless access point device identifier (e.g., a MAC address) for the wireless access point device 202*c* in the wireless communications received from the wireless access point device 202*c*, time-of-flight information and a wireless access point device identifier (e.g., a MAC address) for the wireless access point device 202*d* in the wireless communications received from the wireless access point device 202*d*, and time-of-flight information and a wireless point device identifier (e.g., a MAC address) for the wireless access point device 202*e* in the wireless communications received from the wireless access point device 202*e*.

As discussed above, the wireless access point/user device relative positioning information collected from each the wireless access point devices at the indoor space location 604 in the indoor space 200 (as well as at any other indoor space location in the indoor space 200) provides a unique combination of information that may be utilized to define the indoor space location 604. The table below illustrates a specific example of sets of the wireless access point device identifiers and time-of-flight information (e.g., a "MAC ADDRESS 202*a*" identifying the wireless access point device 202*a* along with time-of-flight information that was identified in the wireless communications received from the wireless access point device 202*a* at the indoor space location 604, a "MAC ADDRESS 202*b*" identifying the wireless access point device 202*b* along with time-of-flight information that was identified in the wireless communications received from the wireless access point device 202*b* at the indoor space location 604, etc.) that may be used to define an indoor space location 604 by associating a "wireless location signature" with that indoor space location 604:

| WIRELESS ACCESS POINT DEVICE IDENTIFIER | TIME-OF-FLIGHT INFORMATION |
|---|---|
| MAC ADDRESS 202a | 130 nS |
| MAC ADDRESS 202b | 140 nS |
| MAC ADDRESS 202c | 20 nS |
| MAC ADDRESS 202d | 90 nS |
| MAC ADDRESS 202e | 105 nS |

Similarly as discussed above with respect to the indoor space location 602, the time-of-flight information includes a calculated time-of-flight (in nanosecond (nS)) that, as discussed above, may be determined by the navigation engine 304 in the user device 300 using the send timestamps provided in the wireless communications provided by the wireless access point devices (along with receive timestamps determined by the navigation engine 304.) However, in other embodiments, different time-of-flight information may be utilized while remaining within the scope of the present disclosure. For example, the wireless access point device identifier for a wireless access point device may be associated with the send time stamp provided by that wireless access point device and the receive time stamp provided by the user device (i.e., so that the navigation system may determine the calculated time-of-flight information in the table above.) In another example, the wireless access point device identifier for a wireless access point device may be associated with a calculated distance and/or relative position between that wireless access point device and the user device 300. As such, a variety of time-of-flight information may be utilized to define the indoor space location 604 by associating a wireless location signature with that indoor space location 602 while remaining within the scope of the present disclosure. Furthermore, while specific wireless access point/user device relative positioning information that utilizes time-of-flight information has been described, one of skill in the art in possession of the present disclosure will recognize that other types of information may provide similar functionality as described below (e.g., other parameters that are known to change at a predictable rate in wireless communications between two devices), and thus that information will fall within the scope of the present disclosure as well.

In some embodiments, at block 504 the navigation engine 304 in the user device 300 may operate to store the wireless access point/user device relative positioning information collected from each the wireless access point devices at the indoor space location 604 in the navigation database 306. Furthermore, at block 504, the navigation engine 304 in the user device 300 operates to transmit the wireless access point/user device relative positioning information collected from each the wireless access point devices at the indoor space location 604 through the communication subsystem 308 to the navigation system 400 (e.g., via a network provided by the wireless access point devices 202a-e, via a different network (e.g., a cellular network accessible via the communication subsystem 308), etc.) Similarly as described above, in addition to the wireless access point/user device relative positioning information, user devices 300 may transmit any sensor information collected by their sensor subsystems 312 at any indoor space location as those user devices 300 move through the indoor space 200. For example, accelerometer data from accelerometer devices in the user device 300, directionality data from gyroscope devices in the user device 300, pedometer data from pedometer devices in the user device 300, and/or any of a variety of other sensor data from sensor devices in the user device 300, may be transmitted to the navigation system 400 at block 504. As such, in addition to relative positioning information, acceleration information, directionality information, step information, and/or other sensor information may be provided to the navigation system 400 at block 504.

While the transmittal of the wireless access point/user device relative positioning information identified at each indoor space location has been described above as being performed separately at each indoor space location, user devices may transmit the wireless access point/user device relative positioning information identified at a plurality of different indoor space locations to the navigation system 400 while remaining within the scope of the present disclosure. For example, user devices may transmit the wireless access point/user device relative positioning information collected from each the wireless access point devices over some time period, in response to no longer receiving wireless communications from any of the wireless access point devices (e.g., in response to leaving the indoor space 200), and/or in response to a variety of other events that would be apparent to one of skill in the art in possession of the present disclosure. Thus, at block 504, the navigation path engine 404 in the navigation system 400 may receive the wireless access point/user device relative positioning information from user devices (e.g., via the communication subsystem 408), and store that wireless access point/user device relative positioning information in the navigation path database 406.

The method 500 then proceeds to block 506 where the navigation system determines respective user paths through the indoor space using the wireless access point device/user device relative positioning information received from the user devices, and stores the respective user paths in a database. In an embodiment, at block 506, the navigation path engine 404 in the navigation system 400 may operate to use the wireless access point device/user device relative positioning information received from the user devices 300 to determine user paths for those user devices. As discussed above, the wireless access point/user device relative positioning information collected by each user device from the wireless access point devices at each indoor space location (e.g., the indoor space locations 602, 604, and any other indoor space locations traversed by the user 600) in the indoor space 200 provides a unique "wireless location signature" or combination of information that may be utilized to define that indoor space location, and the navigation path engine 404 to use a collection of wireless location signatures received from a user device (i.e., a collection of indoor space locations) to determine a user path through the indoor space 200. Such user paths may then be stored by the navigation path engine 404 in the navigation path database 406

Figure 7A:
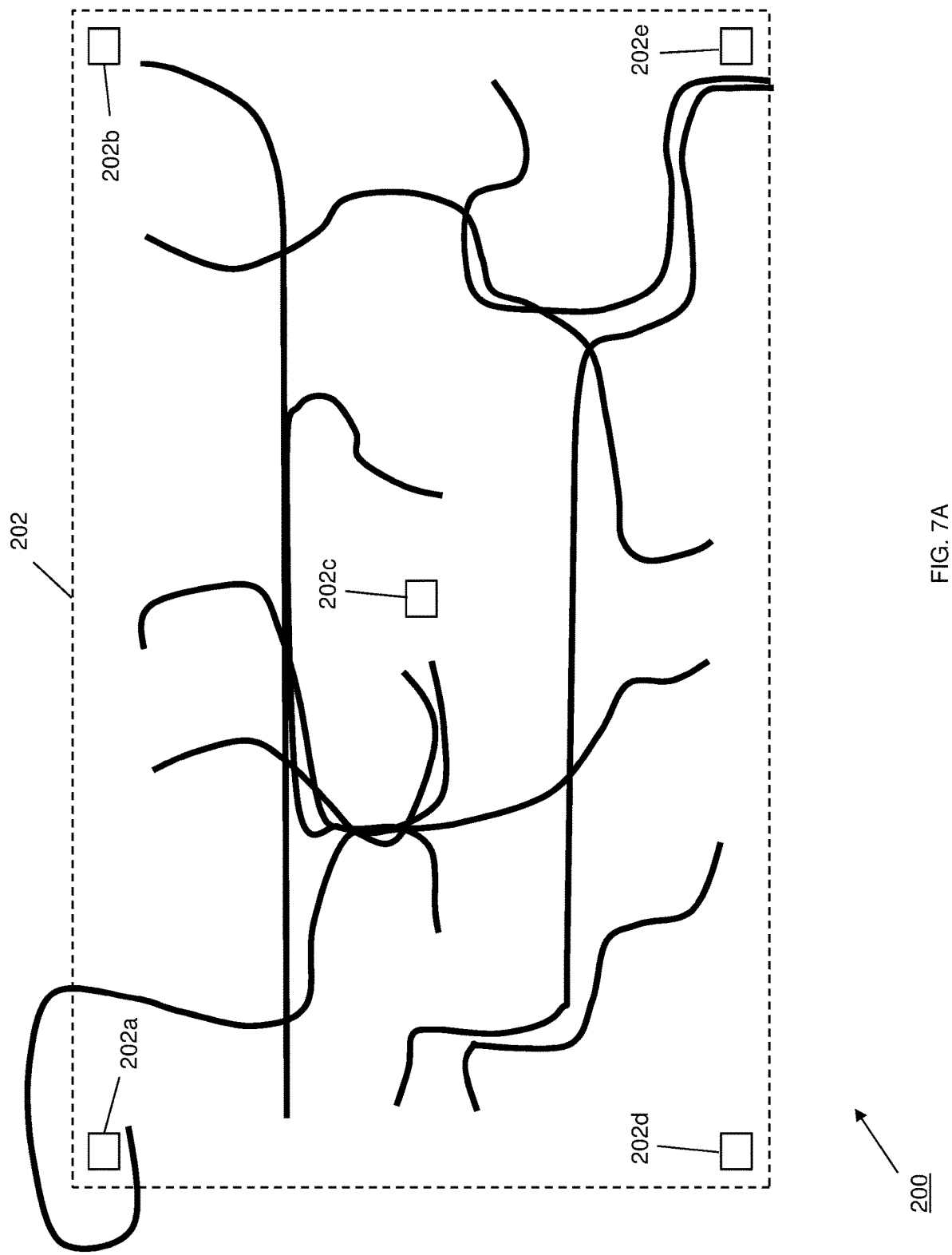
FIG. 7A is a schematic view illustrating an embodiment of a first plurality of user paths determined by the navigation system of FIG. 4 using wireless location signatures like those of FIGS. 6A and 6B.
Figure 7B:
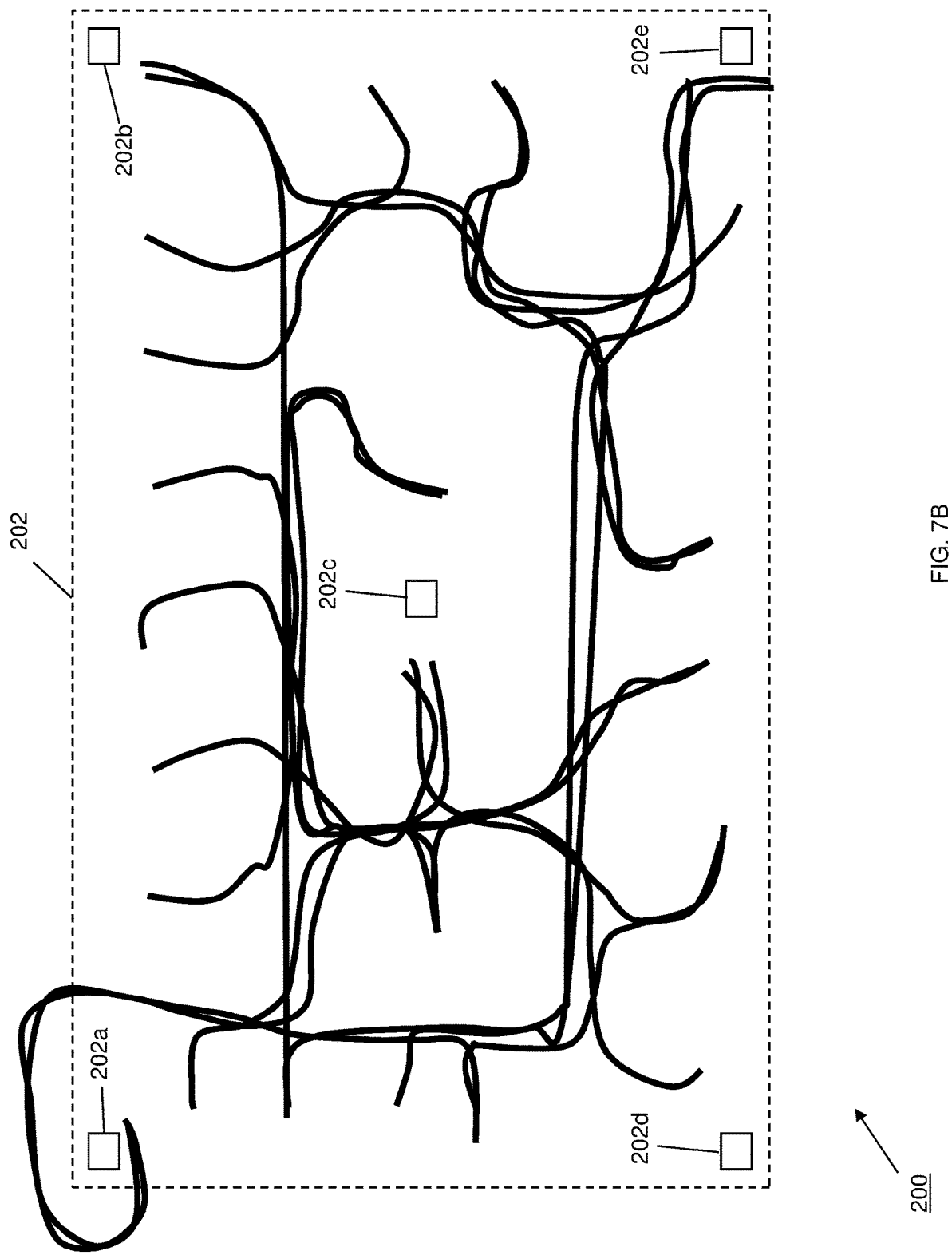
FIG. 7B is a schematic view illustrating an embodiment of a second plurality of user paths determined by the navigation system of FIG. 4 using wireless location signatures like those of FIGS. 6A and 6B.
Figure 7C:
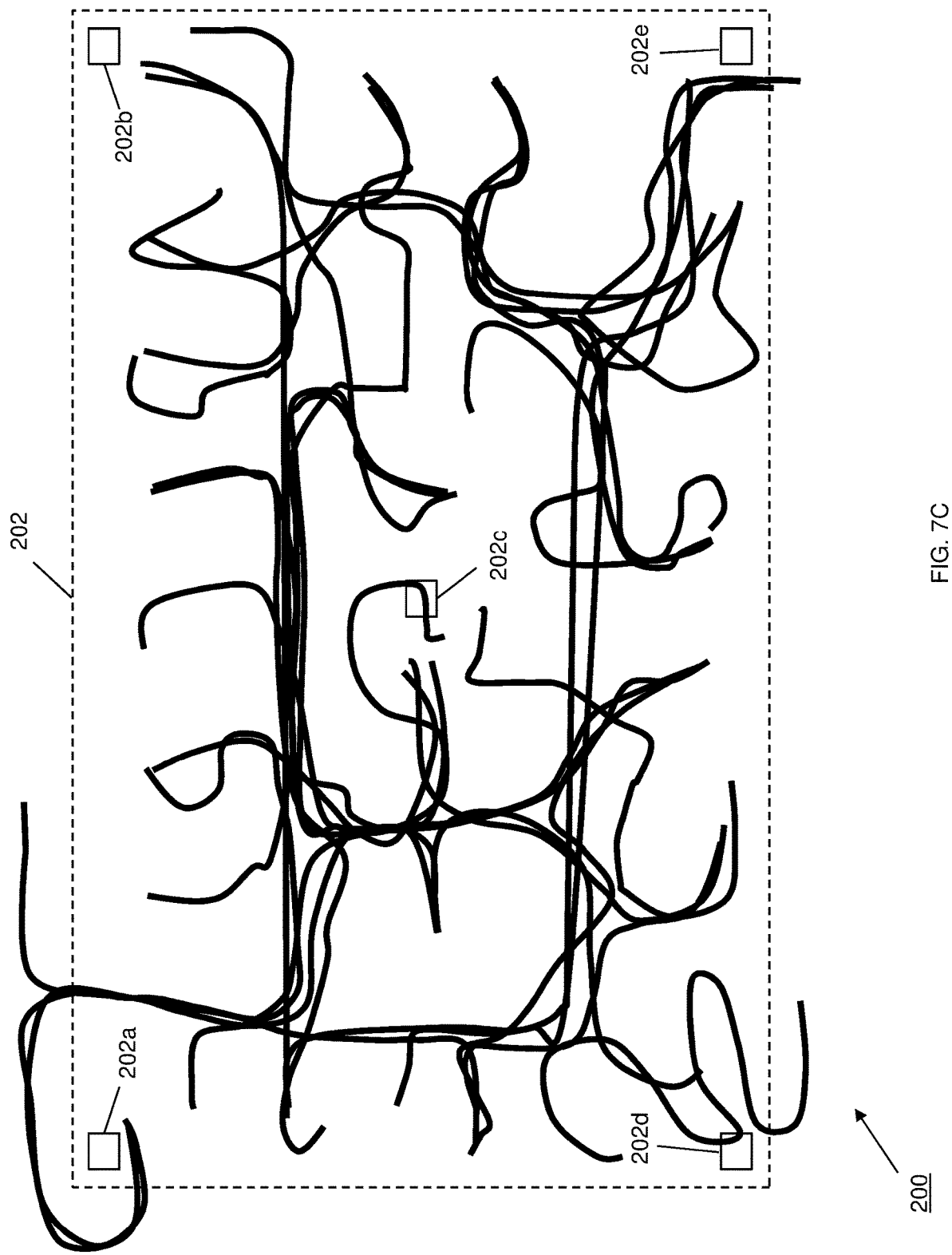
FIG. 7C is a schematic view illustrating an embodiment of a third plurality of user paths determined by the navigation system of FIG. 4 using wireless location signatures like those of FIGS. 6A and 6B.

For example, with reference to FIGS. 7A-C, a plurality of user paths determined over time are illustrated, with FIG. 7A illustrating a first subset of user paths illustrated by the bolded lines) determined at or prior to a first time, FIG. 7B illustrating the first subset of user paths determined at or prior to the first time and a second subset of user paths (illustrated by the bolded lines) determined between the first time and a second time, and FIG. 7C illustrating the first subset of user paths determined at or prior to the first time, the second subset of user paths determined between the first time and a second time, and a third subset of user paths (illustrated by the bolded lines) determined between the second time and a third time. FIGS. 7A-C illustrate how the wireless access point device/user device relative positioning information transmitted by each user device 300 as it moves through the indoor location 200 allows the navigation system 400 to determine a user path for that user 600/user device 300 through the indoor location 200, and how the determination of an increasing number of user paths by the navigation system 400 begins to develop a layout of both available paths through the indoor space 200, as well as obstructions that are indicated by areas in the indoor space through which no user path (or no recent user path) has crossed. Thus, while FIG. 7C only illustrates the determination of user paths up to a third time, one of skill in the art in possession of the present disclosure will recognize how as the number of determine user paths increases, a clearer and clearer "picture" of the all of the available paths in the indoor space 200 will become available (e.g., user paths that cover most/all the open areas of the indoor space 200 will be determined.) Furthermore, when a relatively high number of users move through the indoor space 200 while reporting their wireless access point device/user device relative positioning information, such an available path "picture" will become available relatively quickly.

Figure 8A:
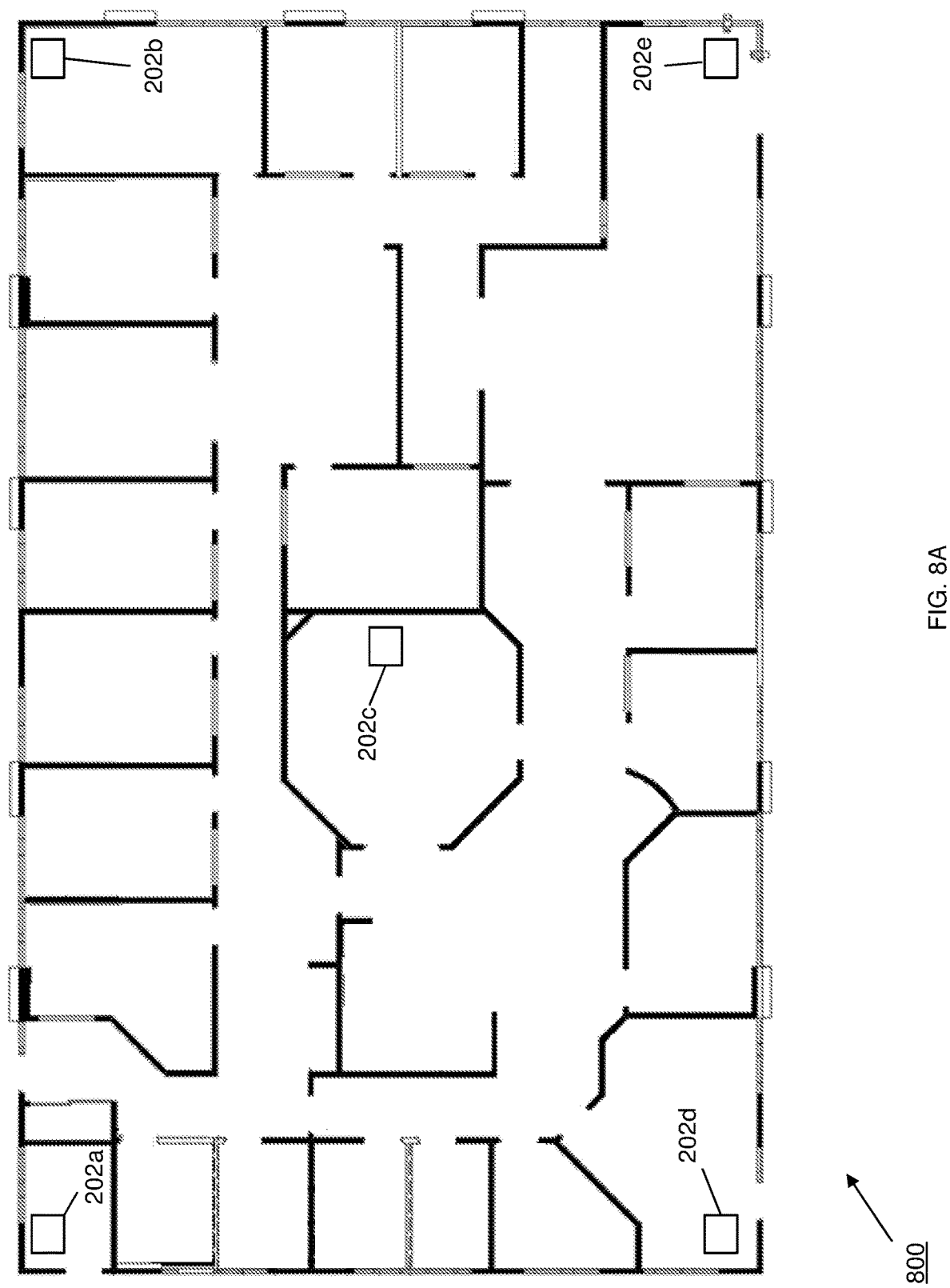
FIG. 8A is a schematic view illustrating an embodiment of an initial indoor space map determined using the user paths like those of FIGS. 7A-7C.

The method 500 then proceeds to optional block 508 where the navigation system may generate an indoor space map using the respective user paths stored in the database. In an embodiment, at optional block 508 the navigation path engine 404 may operate to generate an indoor space map using the stored user paths, and may regenerate increasingly accurate indoor space maps as the number of stored user paths grows. For example, FIG. 8A illustrates an embodiment of an indoor space map 800 that may be generated at a first time using a first plurality of user paths. In the illustrated embodiment, the first plurality of user path used to generate the indoor space map 800 are not illustrated, but one of skill in the art in possession of the present disclosure will recognize that the navigation path engine 404 may use that first plurality of user paths to determine available/unobstructed areas in the indoor space 200 (e.g., the white areas in FIG. 8A corresponding to the rooms of the indoor space 200 illustrated in FIG. 2A), as well as unavailable/obstructed areas in the indoor space 200 (e.g., the black areas corresponding to the inner walls 204 of the indoor space illustrated in FIG. 2A.) While FIG. 8A illustrates a relatively "crisp" or detailed version of the indoor space map 800 that could be generated after a relatively large number of user paths have been determined, less "crisp" or detailed versions of indoor space maps (which may include errors such as misplace or non-existent inner walls or other obstructions) may be generated prior to the indoor space map 800, and may be refined as more user path are determined. Furthermore, FIG. 8A illustrates how the wireless access point device/user device relative positioning information may be used to identify the position of the wireless access point devices 202a-e around the indoor space 200. While not specifically described herein in detail, a variety of statistical and/or analytical techniques may be utilized in generating the indoor space map 800, including estimating the locations of inner walls 204 based on distances users are known to move adjacent such walls, identifying windows based on user path details adjacent those windows (e.g., pausing regularly adjacent such windows), etc. As discussed above, the generation of increasingly precise indoor space maps may be enhanced by associating known locations of the wireless access point devices 202a-e and/or other static features in the indoor space with coarse building maps.

Figure 8B:
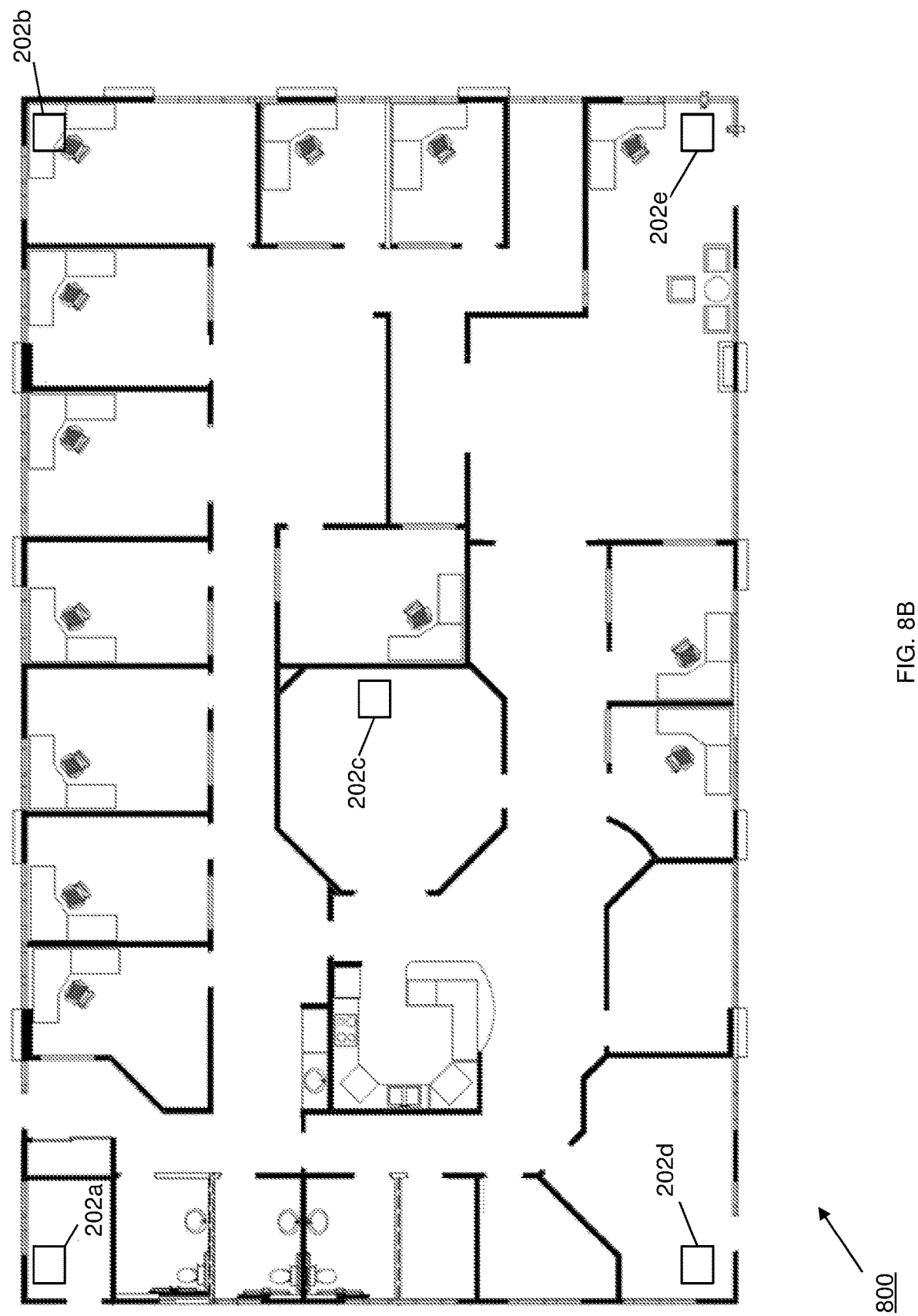
FIG. 8B is a schematic view illustrating an embodiment of an updated indoor space map determined using the user paths like those of FIGS. 7A-7C.

Extending that example, FIG. 8B illustrates an embodiment of an indoor space map 800 that may be generated at a second time that is subsequent to the first time discussed above with regard to FIG. 8A, and using a second plurality of user paths in addition to the first plurality of user paths discussed above with regard to FIG. 8A. In the illustrated embodiment, the second plurality of user path used to generate the indoor space map 800 are not illustrated, but one of skill in the art in possession of the present disclosure will recognize that the navigation path engine 404 may use that second plurality of user paths to determine more details about the available/unobstructed areas in the indoor space 200 (e.g., the white areas in FIG. 8A corresponding to the rooms of the indoor space 200 illustrated in FIG. 2A), as well as more details about the unavailable/obstructed areas in the indoor space 200 (e.g., the area elements such as the furniture, appliances, etc. in the indoor space 200.) FIG. 8B illustrates how, as an increasing number of user paths are determined and analyzed, area elements such as the desks, chairs, tables and/or other area features in the indoor space may be noted in the indoor space map 800. As discussed below, the navigation path engine 404 may operate to analyze the unavailable/obstructed areas in the indoor space 200 and utilize a variety of information to attempt to identify those unavailable/obstructed areas as walls, windows, chairs, tables, and/or any other area feature that would be apparent to one of skill in the art in possession of the present disclosure. In addition, sensor information received from the user devices may be used to identify unavailable/obstructed areas (e.g., sensor information received from a user device may indicate that a user is sitting, helping to identify that an unavailable/obstructed area is a chair or table.)

One of skill in the in art in possession of the present disclosure will recognize that the indoor space map 800 may change over time as the determined user paths change to accommodate for changes in the indoor space 200. For example, the movement of a table, a chair, a wall (e.g., a partition such as a "cube" wall), etc., will result in users moving along subsequent user paths that avoid those obstructions. As those updated user paths are determined as discussed above, the navigation path engine 404 will recognize new available paths, and new obstructions, in the indoor space 200, and modify the indoor space map 800 to account for them. As such, the indoor space map 800 is dynamic and/or adaptable in that it may change as the elements of the indoor space change and users select user paths through that indoor space in response to those changes.

The method 500 then proceeds to optional block 510 where the navigation system may determine an area identity of area(s) on the indoor space map. In an embodiment, at block 510, the navigation path engine 404 in the navigation system 400 may operate to determine area identities of areas in the indoor space map 800. For example, the navigation path engine 404 may be configured to recognize the areas on the indoor space map 800 that correspond to the available/unobstructed areas in the indoor space 200 that are bounded by the unavailable/obstructed areas (e.g., the inner walls 204 of the indoor space 200), and then may utilize a variety of statistical and/or analytical techniques or assumptions, as well as access a variety of information, in order to determine an area identity for those areas.

In a specific example, the navigation path engine 404 may be configured to recognize areas on the indoor space map 800 that include the available/unobstructed areas bounded by the unavailable/obstructed areas, and that include a single entrance (e.g., as identified by all user paths entering that area through a common location), as a particular type of room, the identity of which may be narrowed down by additional information. For example, user devices 300 transmitting wireless access point device/user device relative positioning information may also transmit user information about their associated user 600 (e.g., a user identifier such as an employee number, a link to a social media profile of the user 600, etc.), and when the particular type of room discussed above is associated with the same user repeatedly being located in that room for extended period of time, that room may be identified as an office room. In some embodiments, the additional information may allow the navigation system 400 to identify the office room as belonging to that particular user (e.g., "Joe's office").

In another specific example, when the particular type of room discussed above is associated with different users being located in that room for limited periods of time, that room may be identified as a restroom, and the identity of that restroom may be narrowed further if the user information indicates a gender of the users that typically utilize that restroom (i.e., a men's restroom or a women's restroom.) In another specific example, when the particular type of room discussed above is associated with the same user being located in that room for limited periods of time, and the user information associated with that user indicates that the user works in information technology, that room may be identified as a server room. In yet another example, if the user paths indicate that a vast majority of users enter the indoor location 200 via that room, it may be identified as a reception room.

In yet another specific example, the navigation path engine 404 may be configured to recognize areas on the indoor space map 800 that include the available/unobstructed areas bounded by the unavailable/obstructed areas, and that include a multiple entrances (e.g., as identified by user paths entering that area through different location), as a particular type of room, the identity of which may be narrowed down by additional information. For example, when that particular type of room is associated with different users being located in that room in the morning and at lunchtime, that room may be identified as a kitchen or lunchroom. In yet another specific example, when that particular type of room is associated with different users being located in that room during the same time periods, that room may be identified as a conference room. However, while a few relatively simple specific examples of identifying areas on the indoor space map have been provided, one of skill in the art in possession of the present disclosure will appreciate that much more advanced/complicated statistical and/or analytical techniques, as well as more details outside information, may be utilized to determine area identities while remaining within the scope of the present disclosure. Furthermore, as discussed above, the identification of area elements in those areas of the indoor space 200 using similar techniques will fall within the scope of the present disclosure as well. For example, if a user is co-located with an area element for relatively long periods of time, that are element may be identified (or displayed as) a chair, while if a user spends relatively long periods of time adjacent an area element, that area element may be identified as a desk.

Figure 9:
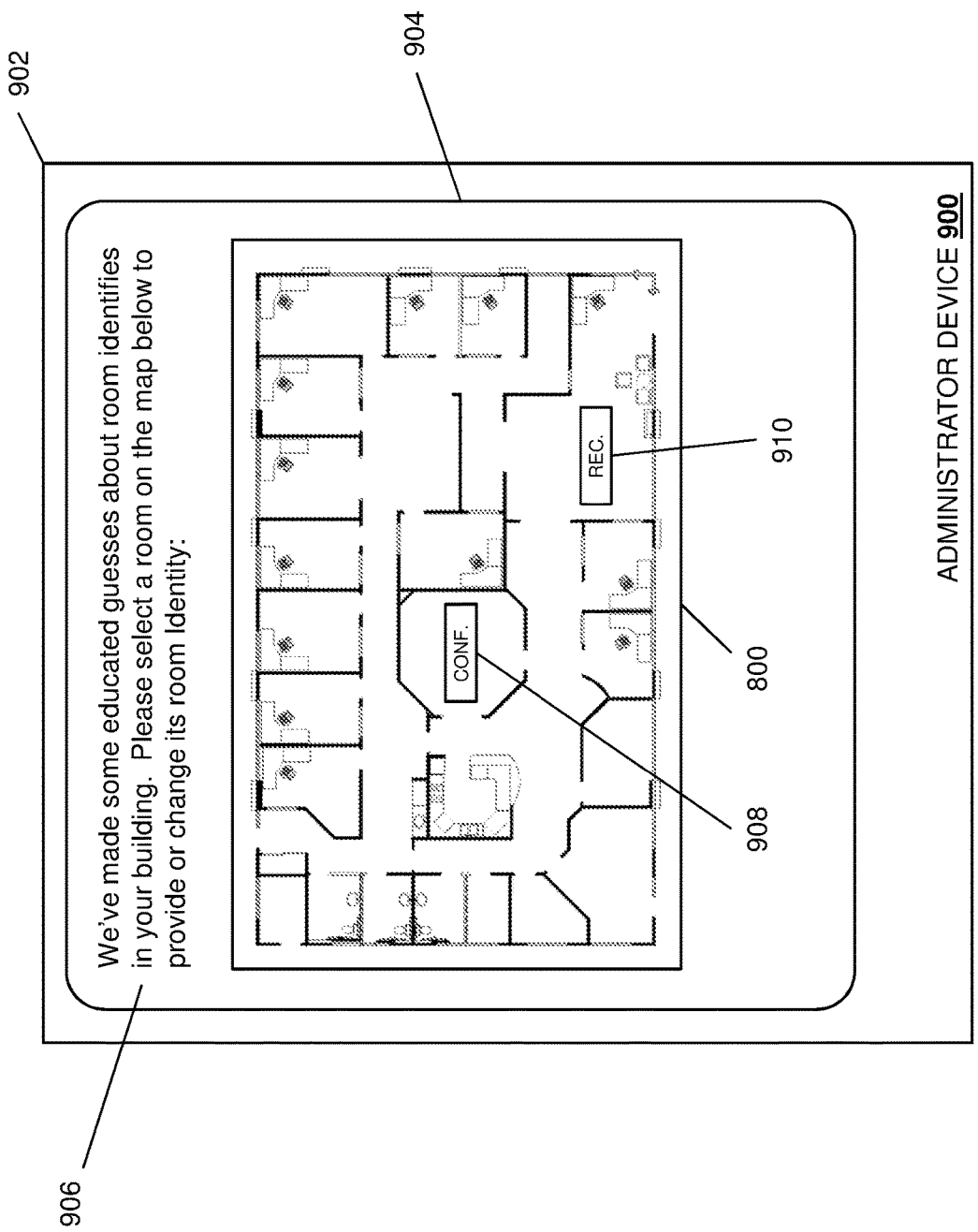
FIG. 9 is a screen shot view illustrating an embodiment of an administrator device identifying and/or confirming room identifies on the second indoor space map of FIG. 8B.

Referring to FIG. 9, an embodiment of an administrator device 900 is illustrated that may be the IHS 100 discussed above with reference to FIG. 1, and/or may include some or all of the components of the IHS 100. The administrator device 900 includes a chassis 902 that houses a display screen 904 that is illustrated displaying are area identification screen 906. For example, the administrator device 900 may be operated by an administrator of the indoor space 200 (e.g., a building or office administrator), although in other embodiments the actions performed via the administrator device 900 may be performed by any user of the indoor navigation path system of the present disclosure. In the illustrated embodiment, the area identification screen 906 includes the indoor space map 800 that includes an area identifier 908 that identifies an area on the indoor space map 800 as a conference room ("CONF") and an identifier 910 that identifies an area on the indoor space map 900 as a reception room ("REC"), and those area identifiers 908 and 910 may have been determined by the navigation engine 404 as discussed above. However, optional block 510, the area identification screen 906 may also be configured to allow the administrator or other user to select any area on the indoor space map 800 to provide an identification of that area (e.g., type in "OFFICE", "SERVER ROOM", etc.) or change an identification that was determined for that area. As such, areas on the indoor space map 800 may be determined using information provided by users of the indoor navigation path determination system as well.

In yet another example, areas on the indoor space map 800 may be identified by users that "tag" particular locations in the indoor space 200 with area identification information. For example, a user may utilize an application on their user device 300 that allows them identify (or "tag") their current location, and the user may use that application to provide area identification information (e.g., "User 600 is in conference room A"). The navigation path engine 404 may then access that application, recognize that area identification information, associate that area identification information with the user device 300, and use that information to determine the identity of the associated area on the indoor space map 800 that corresponds to the current location of the user device 300 (which is defined by a unique wireless location signature as discussed above). In yet another embodiment, a user may provide area identification information in a calendar or instant messaging application of the user, and the navigation path engine 404 may use that area identification information to determine the identity of an area on the indoor space map 800. For example, a user may identify a meeting on their calendar that is occurring in a particular office room in the indoor space 200 at a particular time period, and the navigation path engine 404 may retrieve that meeting from the calendar, recognize the office room as area identification information, and use it to identify the area in which that user is located during the particular time period (which is defined by a plurality of unique wireless location signatures as discussed above).

In yet another example, areas on the indoor space map 800 may be identified by wireless access point devices in the indoor space 200 with area identification information. For example, wireless access point devices may include names correlated with areas within the indoor space (e.g., "conference room wifi"), and the navigation path engine 404 may be configured to recognize those correlations as area identification information, and identify areas within the indoor space 200 as a result.

The method 500 then proceeds to block 512 where the navigation system determines a navigation path through the indoor space. In an embodiment, at block 512, the navigation path engine 404 may operate to determine a navigation path through the indoor space 200. In some embodiments, the navigation path may be determined at block 512 using the indoor space map 800 that was generated using the user paths stored in the navigation path database 406. For example, a user in or around the indoor space 200 may identify a destination location in the indoor space 200 by, for example, providing an area identity of an area around the indoor space 200, selecting an area on the indoor space map 800 displayed on the user device 300, and/or using a variety of techniques known in the art. In response, the navigation path engine 404 in the navigation system 400 may then determine one or more corresponding wireless location signatures (e.g., the sets of wireless access point identifiers and time-of-flight information discussed above) for that destination location. The navigation path engine 404 may then retrieve a current location of the user device 300 of that user (which is defined by a unique wireless location signature as discussed above), and then utilize the indoor space location map 800 (generated via the plurality of user paths as discussed above) to determine a navigation path through the indoor space 200 from the current location to the destination location (e.g., that moves between the wireless location signatures discussed above.)

In some embodiments using this example, the navigation path engine 404 may find one or more user paths that extend between the current location and the destination location and use those "full" user paths to determine the navigation path. In other embodiments using this example, the navigation path engine 404 may find one or more user paths that include at least a portion of that user path that covers a segment of a possible path between the current location and the destination location, and use those user path "segments" to determine the navigation path in addition to, or in place of, the "full" user paths. In other embodiments using this example, the navigation path engine 404 may deduce user paths based on its knowledge of all of the user paths available in the indoor space, use those "deduced" user paths to determine the navigation path in addition to, or in place of, the "full" user paths and/or user path "segments".

However, in other embodiments, the navigation path may be determined at block 512 using the user paths stored in the navigation path database 406 (e.g., without the need to determine and/or use the optionally determined indoor space map 800 discussed above.) For example, as discussed above, user locations in the indoor space 200 may be identified by users via, for example, social media accounts, calendars, instant messaging applications, and/or other applications. In a specific example, a first user may "tag" their location to identify their location (a "first user location" associated with a unique wireless location signature) that corresponds to a meeting that other users will be attending. A second user attending that meeting may then use their user device to provide their current location (e.g., a "navigating user location" associated with a unique wireless location signature), and the navigation path engine 404 may access the navigation path database to determine the user paths that provide routes between the navigating user location (and its corresponding wireless location signature) and the first user location (and its corresponding wireless location signature.) The navigation path engine 404 may then select or generate a navigation path based on the "full" user paths, user path "segments", and/or "deduced" user paths that include the corresponding wireless location signatures for the navigating user location and the first user location, and that provides a route that may satisfy any of a variety of route characteristics (e.g., a quickest route, a route that avoids stairs, a route that traverses past a restroom, a route that requires the fewest number of steps) that may be defined by the user.

While a few examples of the determination of navigation paths have been described, one of skill in the art in possession of the present disclosure will recognize that any of a variety of navigation paths may be determined in a variety of manners that will fall within the scope of the present disclosure. For example, an indoor space location identified by a user, or a current location of a user device may not correspond to any wireless location signature included in any of the determined user paths stored in the navigation path database 406. In such situations, the navigation path engine 404 may determine a delta or difference between the identified indoor space location and known indoor space locations (e.g., indoor space locations associated with previously received wireless location signatures), and estimate the wireless location signature for that identified indoor space location.

Figure 10:
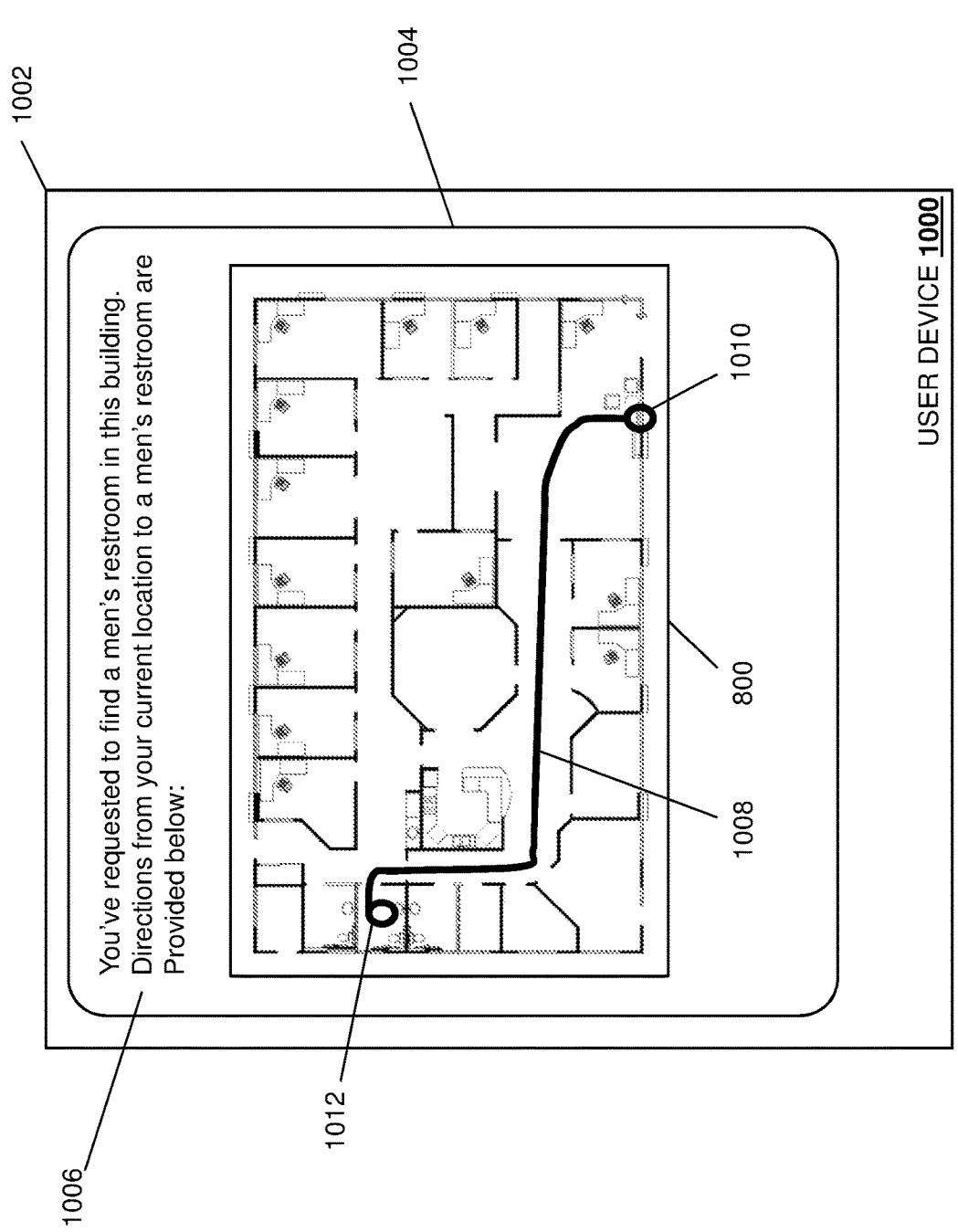
FIG. 10 is a screen shot view illustrating an embodiment of a user device displaying a navigation path on the second indoor space map of FIG. 8B.

The method 500 then proceeds to optional block 514 where the navigation system may provide the navigation path and the indoor space map for display. In an embodiment, at block 514, the navigation path engine 404 may provide the indoor space map 800 and the navigation path determined at block 512 to the user device for display. Referring to FIG. 10, a user device 1000 (which may be substantially similar to the user device 300 discussed above) that includes a chassis 1002 housing a display device 1004 is illustrated displaying an indoor navigation screen 1006 that includes the indoor space map 800 along with a navigation path 1008 between a current location 1010 of the user device 1000 and a destination location 1012 provided by the user device 1000. As such, with reference to the example above in which the navigation path engine 404 determines a navigation path using the indoor space map 800, the navigation path engine 404 may receive the destination location identified via the user device 1000, retrieve a current location of the user device 1000, utilize the indoor space location map 800 to determine the navigation path 1008 from the current location to the destination location as described above, and provide the indoor navigation screen 1006 for display on the user device 1000, as illustrated in FIG. 10. As such, a user of the user device 1000 may navigate to the destination location 1012 using the indoor navigation screen 1006, which may update the location of the user device 1000 within the indoor space map 800 as the user device 1000 moves along the navigation path 1008 (e.g., using the sensor information received from the sensor subsystems 312 in the user device 300/1000.)

Figure 11:
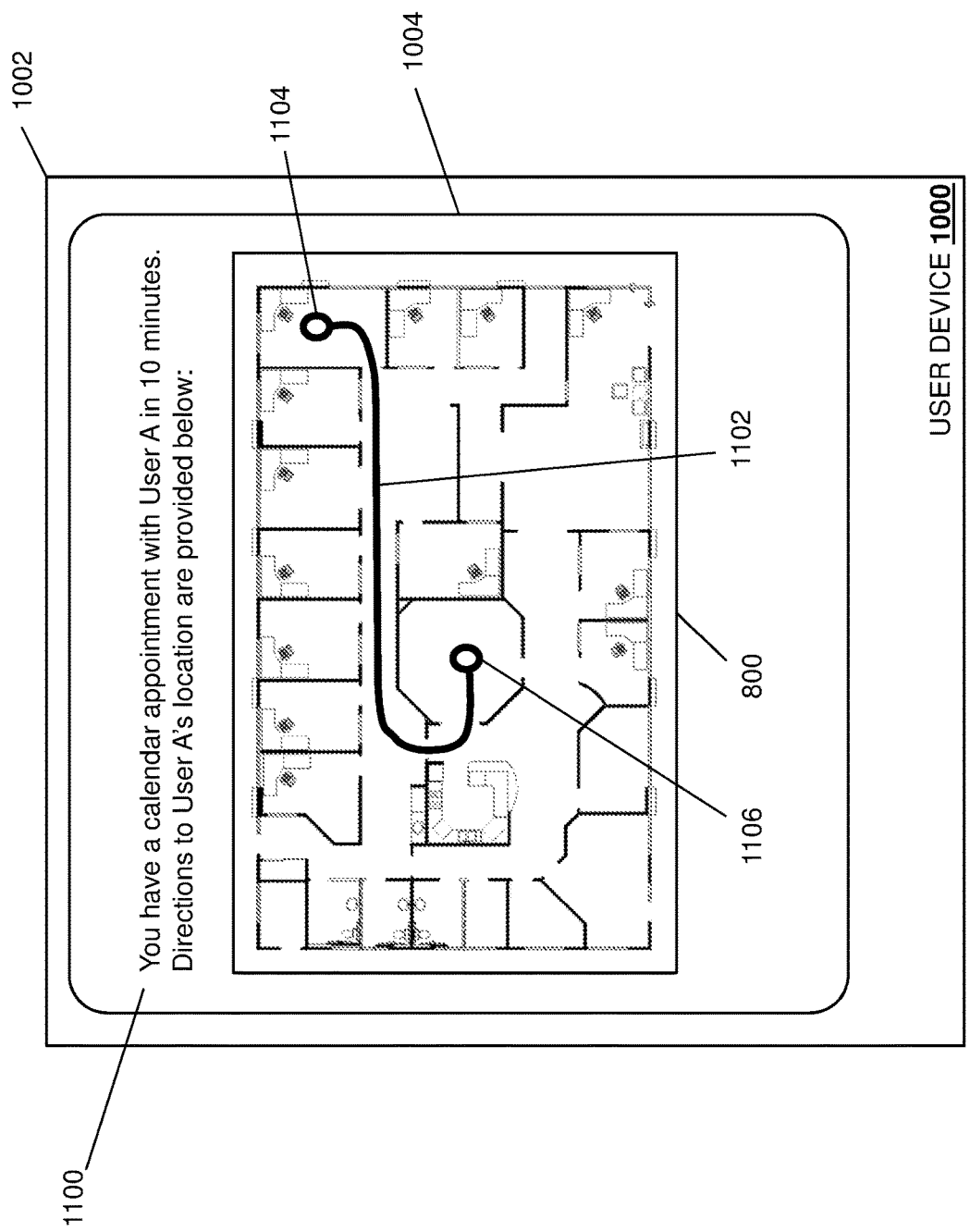
FIG. 11 is a screen shot view illustrating an embodiment of a user device displaying a navigation path on the second indoor space map of FIG. 8B.

In another embodiment, at optional block 514, the navigation path engine 404 may provide the indoor space map 800 and the navigation path determined at block 512 to the user device for display. Referring to FIG. 11, the user device 1000 is illustrated displaying an indoor navigation screen 1100 that includes the indoor space map 800 along with a navigation path 1102 between a navigating user location 1104 of the user device 1000 and a first user location 1106 of another user. As such, with reference to the example above in which the navigation path engine 404 determines a navigation using the user paths stored in the navigation path database 406, the navigation path engine 404 may receive the first user location identified via the user, retrieve a navigating user location of the user device 1000, utilize the user paths in the navigation path database 406 to determine the navigation path 1102 from the navigating user location to the first user location as described above, and provide the indoor navigation screen 1100 for display on the user device 1000, as illustrated in FIG. 11. As such, a user of the user device 1000 may navigate to the first user location 1106 using the indoor navigation screen 1100, which may update the location of the user device 1000 within the indoor space map 800 as the user device 1000 moves along the navigation path 1102 (e.g., using the sensor information received from the sensor subsystems 312 in the user device 300/1000.)

While optional block 514 is illustrated and described as utilizing the optional indoor space map 800 generated at optional block 508, in some embodiments the navigation path determined at block 512 may be provided to a user without the need to generate and/or display such indoor space maps. For example, rather than provide a graphical map, the user device 1000 may display text and/or audio instructions based on the determined navigation path. As such, upon determining a navigation path between a first unique wireless location signature and a second unique wireless location signature in the indoor space 200, the user device 1000 may utilize the sensor subsystem 312 to determine movement and directionality information to provide instructions such as "proceed 100 feet and turn right, then enter the second room on your right", and/or a variety of other navigation instructions that would be apparent to one of skill in the art in possession of the present disclosure.

Thus, systems and methods have been described that provide for the determination of navigation paths through an indoor space without requiring the pre-provisioning of conventional mapping information that precisely maps the indoor space and obstructions in a building, as well as the locations of user location sensors in that indoor space. Rather, the systems and methods of the present disclosure utilize relative positioning information identified by user devices via their communications with wireless communication devices, and associates unique combinations of that relative positioning information with each indoor space location around the indoor space, which allows for the determination and storage of user paths of a plurality of different user devices through the indoor space. Those user paths may be analyzed to determine available navigation paths through the indoor space, while also indicating obstructions in the indoor space, which provides the ability to automatically generate graphical indoor space maps which may be used to display navigation paths through the indoor space. As such, indoor space navigation is enabled using wireless communication devices that simply need to provide the relative positioning information discussed above, and without the need to generate and periodically update the time intensive and expensive conventional mapping information that is required by conventional indoor space navigation systems, thus providing for increased adoption of indoor space navigation systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A navigation path determination system, comprising:
a navigation system;
a plurality of wireless access point devices positioned around an indoor space; and
a plurality of user devices that are each configured to:
transmit, while located at each of a plurality of different indoor space locations around the indoor space, wireless communications with each of the plurality of wireless access point devices;
identify, in respective wireless communications with each of the plurality of wireless access point devices while located at each of the plurality of different indoor space locations around the indoor space, wireless access point device/user device relative positioning information;
identify, while located at each of the plurality of different indoor space locations around the indoor space, sensor information collected by a sensor subsystem included on each of the plurality of user devices; and
transmit, over a network while located at each of the plurality of different indoor space locations around the indoor space, the wireless access point device/user device relative positioning information and the sensor information to the navigation system, wherein the navigation system is configured to:
receive, through the network from each of the plurality of user devices, the wireless access point device/user device relative positioning information and the sensor information identified by that user device while located at each of the plurality of different indoor space locations around the indoor space;
determine, using the wireless access point device/user device relative positioning information received from each of the plurality of user devices, a respective user path through the indoor space by that user device;
determine, using at least the wireless access point device/user device relative positioning information and the sensor information received from each of the plurality of user devices, at least one obstruction in the indoor space and a type of the at least one obstruction;
determine, using the plurality of respective user paths and user information received from each of the plurality of user devices, an area identity of one or more areas in the indoor space;
store each of the plurality of respective user paths in a navigation path database; and
determine, using the plurality of respective user paths stored in the navigation path database, the at least one obstruction in the indoor space, and the area identities of the one or more areas in the indoor space, a navigation path through the indoor space.

2. The navigation path determination system of claim 1, wherein the wireless access point device/user device relative positioning information identified in the respective wireless communications with each of the plurality of wireless access point devices includes:
a wireless access point device identifier associated with the wireless access point device providing that wireless communication; and
time-of-flight information associated with that wireless communication.

3. The navigation path determination system of claim 2, wherein the wireless access point device/user device relative positioning information includes, for each of the plurality of different indoor space locations around the indoor space, a unique combination of sets of the wireless access point device identifier and the time-of-flight information.

4. The navigation path determination system of claim 1, wherein the navigation system is configured to:
generate, using the plurality of respective user paths stored in the navigation path database, a graphical indoor space map that includes the at least one obstruction; and
provide the graphical indoor space map for display on a display device that identifies the type of the at least one obstruction.

5. The navigation path determination system of claim 4, wherein the navigation system is configured to:
provide the area identity for display on the graphical indoor space map.

6. The navigation path determination system of claim 1, wherein the navigation system is configured to:

access, through the network, a first user social media account to identify a first user location;
receive, through the network from a navigating user device, a navigating user location; and
determine the navigation path through the indoor space using the plurality of respective user paths, the first user location, and the navigating user location.

7. An Information Handling System (IHS), comprising:
a processing system; and
a memory system that is coupled to the processing system and that includes instructions that, when executed by the processing system, cause the processing system to provide a navigation path engine that is configured to:
receive, through a network from each of a plurality of user devices, wireless access point device/user device relative positioning information received by that user device via respective wireless communications with each of a plurality of wireless access point devices positioned around an indoor space, and identified by that user device while located at each of a plurality of different indoor space locations around the indoor space;
receive, through the network from each of the plurality of user devices, sensor information collected by a sensor subsystem included on each of the plurality of user devices;
determine, using the wireless access point device/user device relative positioning information received from each of the plurality of user devices, a respective user path through the indoor space by that user device;
determine, using at least the wireless access point device/user device relative positioning information and the sensor information received from each of the plurality of user devices, at least one obstruction in the indoor space and a type of the at least one obstruction;
determine, using the plurality of respective user paths and user information received from each of the plurality of user devices, an area identity of one or more areas in the indoor space;
store each of the plurality of respective user paths in a navigation path database; and
determine, using the plurality of respective user paths stored in the navigation path database, the at least one obstruction in the indoor space, and the area identities of the one or more areas in the indoor space, a navigation path through the indoor space.

8. The IHS of claim 7, wherein the wireless access point device/user device relative positioning information identified in the respective wireless communications with each of the plurality of wireless access point devices includes:
a wireless access point device identifier associated with the wireless access point device providing that wireless communication; and
time-of-flight information associated with that wireless communication.

9. The IHS of claim 8, wherein the wireless access point device/user device relative positioning information includes, for each of the plurality of different indoor space locations around the indoor space, a unique combination of sets of the wireless access point device identifier and the time-of-flight information.

10. The IHS of claim 7, wherein the navigation path engine is configured to:
generate, using the plurality of respective user paths stored in the navigation path database, a graphical indoor space map that includes the at least one obstruction; and
provide the graphical indoor space map for display on a display device that identifies the type of the at least one obstruction.

11. The IHS of claim 10, wherein the navigation path engine is configured to:
provide the area identity for display on the graphical indoor space map.

12. The IHS of claim 7, wherein the navigation path engine is configured to:
access, through the network, a first user social media account to identify a first user location;
receive, through the network from a navigating user device, a navigating user location; and
determine the navigation path through the indoor space using the plurality of respective user paths, the first user location, and the navigating user location.

13. The IHS of claim 7, wherein the navigation path engine is configured to:
receive, through the network from a navigating user device, a destination location;
receive, through the network from the navigating user device, a current location; and
determine the navigation path through the indoor space using the plurality of respective user paths, the current location, and the destination location.

14. A method for determining indoor navigation paths, comprising:
receiving, by a navigation system through a network from each of a plurality of user devices, wireless access point device/user device relative positioning information received by that user device via respective wireless communications with each of a plurality of wireless access point devices positioned around an indoor space, and identified by that user device while located at each of a plurality of different indoor space locations around the indoor space;
receiving, by the navigation system through the network from each of the plurality of user devices, sensor information collected by a sensor subsystem included on each of the plurality of user devices;
determining, by the navigation system using the wireless access point device/user device relative positioning information received from each of the plurality of user devices, a respective user path through the indoor space by that user device;
determining, by the navigation system using at least the wireless access point device/user device relative positioning information and the sensor information received from each of the plurality of user devices, at least one obstruction in the indoor space and a type of the at least one obstruction;
determine, by the navigation system using the plurality of respective user paths and user information received from each of the plurality of user devices, an area identity of one or more areas in the indoor space;
storing, by the navigation system, each of the plurality of respective user paths in a navigation path database; and
determining, by the navigation system using the plurality of respective user paths stored in the navigation path database, the one or more obstructions, the type of the at least one obstruction, and the area identities of the one or more areas in the indoor space, a navigation path through the indoor space.

15. The method of claim 14, wherein the wireless access point device/user device relative positioning information identified in the respective wireless communications with each of the plurality of wireless access point devices includes:
- a wireless access point device identifier associated with the wireless access point device providing that wireless communication; and
- time-of-flight information associated with that wireless communication.

16. The method of claim 15, wherein the wireless access point device/user device relative positioning information includes, for each of the plurality of different indoor space locations around the indoor space, a unique combination of sets of the wireless access point device identifier and the time-of-flight information.

17. The method of claim 14, further comprising:
generating, by the navigation system using the plurality of respective user paths stored in the navigation path database, a graphical indoor space map that includes the at least one obstruction; and
providing, by the navigation system, the graphical indoor space map for display on a display device that identifies the type of the at least one obstruction.

18. The method of claim 17, further comprising:
providing, by the navigation system, the area identity for display on the graphical indoor space map.

19. The method of claim 14, further comprising:
accessing, by the navigation system through the network, a first user social media account to identify a first user location;
receiving, by the navigation system through the network from a navigating user device, a navigating user location; and
determining, by the navigation system, the navigation path through the indoor space using the plurality of respective user paths, the first user location, and the navigating user location.

20. The method of claim 14, further comprising:
receiving, by the navigation system through the network from a navigating user device, a destination location;
receiving, by the navigation system through the network from the navigating user device, a current location; and
determining, by the navigation system, the navigation path through the indoor space using the plurality of respective user paths, the current location, and the destination location.

* * * * *